(12) United States Patent
Yamazaki et al.

(10) Patent No.: US 10,200,590 B2
(45) Date of Patent: Feb. 5, 2019

(54) IMAGE PICKUP APPARATUS AND METHOD OF CONTROLLING THE SAME

(71) Applicant: CANON KABUSHIKI KAISHA, Tokyo (JP)

(72) Inventors: Hiroshi Yamazaki, Machida (JP);
Yoshinobu Sato, Yokohama (JP);
Akemi Kikuchi, Kawasaki (JP);
Daisuke Toguchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/202,706

(22) Filed: Jul. 6, 2016

(65) Prior Publication Data

US 2017/0034421 A1     Feb. 2, 2017

(30) Foreign Application Priority Data

Jul. 31, 2015   (JP) .................................. 2015-152454

(51) Int. Cl.
*H04N 5/222* (2006.01)
*H04N 5/232* (2006.01)

(52) U.S. Cl.
CPC ..... *H04N 5/23212* (2013.01); *H04N 5/23229* (2013.01); *H04N 5/23293* (2013.01)

(58) Field of Classification Search
None
See application file for complete search history.

(56) References Cited

U.S. PATENT DOCUMENTS

| | | | |
|---|---|---|---|
| 4,563,700 A | 1/1986 | Sato | |
| 4,636,837 A | 1/1987 | Sato | |
| 4,712,136 A | 12/1987 | Tsunekawa et al. | |
| 4,797,945 A | 1/1989 | Suzuki et al. | |
| 4,897,734 A | 1/1990 | Sato et al. | |
| 5,065,446 A | 11/1991 | Suzuki et al. | |
| 5,671,343 A | 9/1997 | Kondo et al. | |
| 5,737,620 A | 4/1998 | Sato | |
| 6,384,935 B1 | 5/2002 | Yamazaki | |
| 7,116,445 B2 | 10/2006 | Uchiyama et al. | |
| 7,196,804 B2 | 3/2007 | Yamazaki et al. | |
| 9,270,902 B2 | 2/2016 | Watanabe et al. | |
| 2013/0335618 A1 | 12/2013 | Sugawara | |
| 2016/0134807 A1 | 5/2016 | Tsutsumi | |

FOREIGN PATENT DOCUMENTS

| | | |
|---|---|---|
| JP | 2014-003404 A | 1/2014 |
| JP | 2014-197824 A | 10/2014 |

*Primary Examiner* — Stephen P Coleman
(74) *Attorney, Agent, or Firm* — Venable LLP

(57) ABSTRACT

Provided are an image pickup apparatus and a method of controlling the image pickup apparatus, capable of quickly determining possibility of refocusing for bringing each of objects located at different view angle positions on a photographed image into focus. The image pickup apparatus includes an acquisition unit configured to acquire an image photographed by using an image pickup element having a pupil-division pixel area together with photographing information of an optical system at a time of photographing, an object detecting unit configured to calculate an object area of an object and to calculate an object distance corresponding to a depth distance to the object, and a refocusing possibility determining unit configured to determine possibility of refocusing for bringing the object into focus by calculating a refocusable view angle range and determining whether or not the object area is included in the refocusable view angle range through comparison.

20 Claims, 20 Drawing Sheets

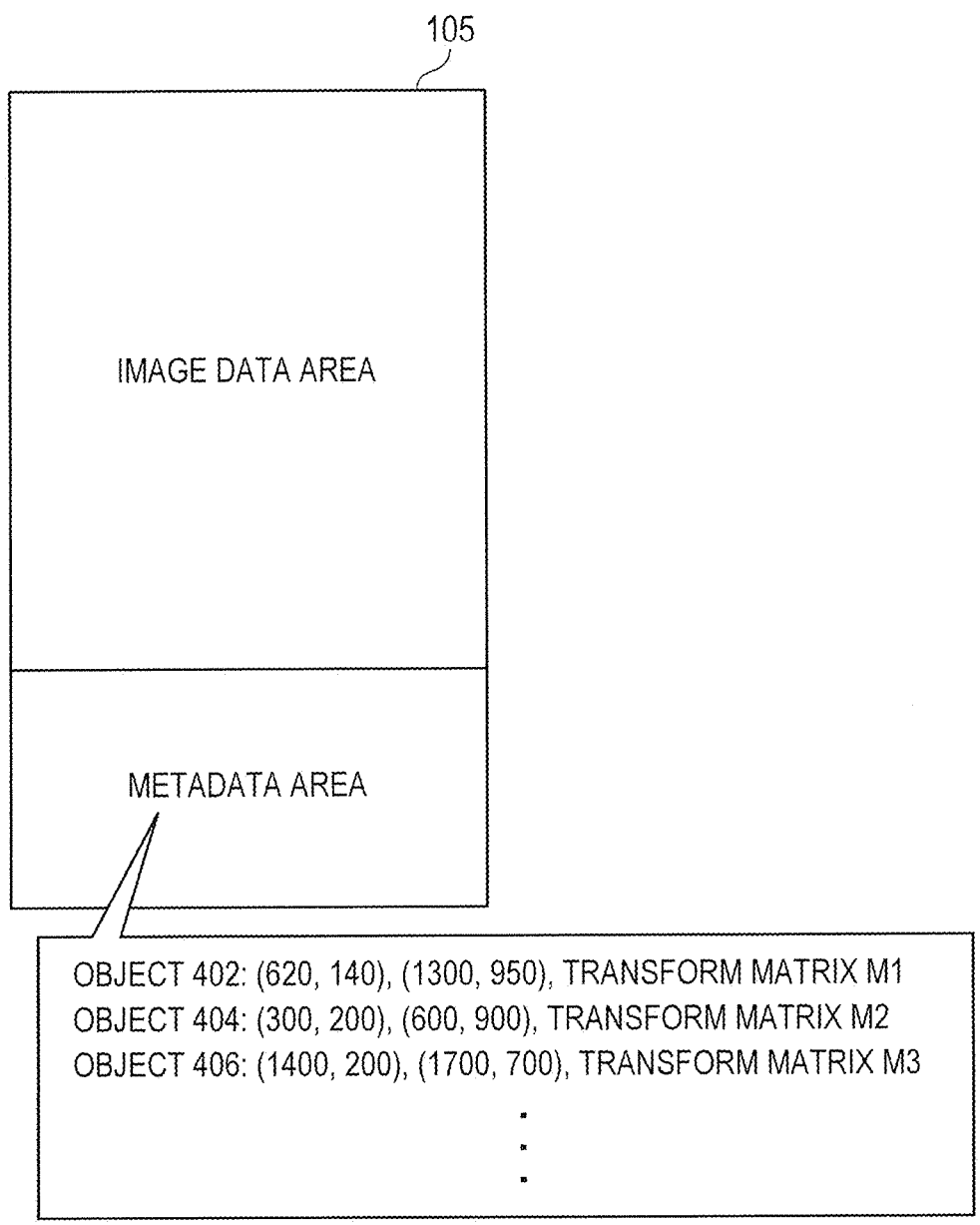

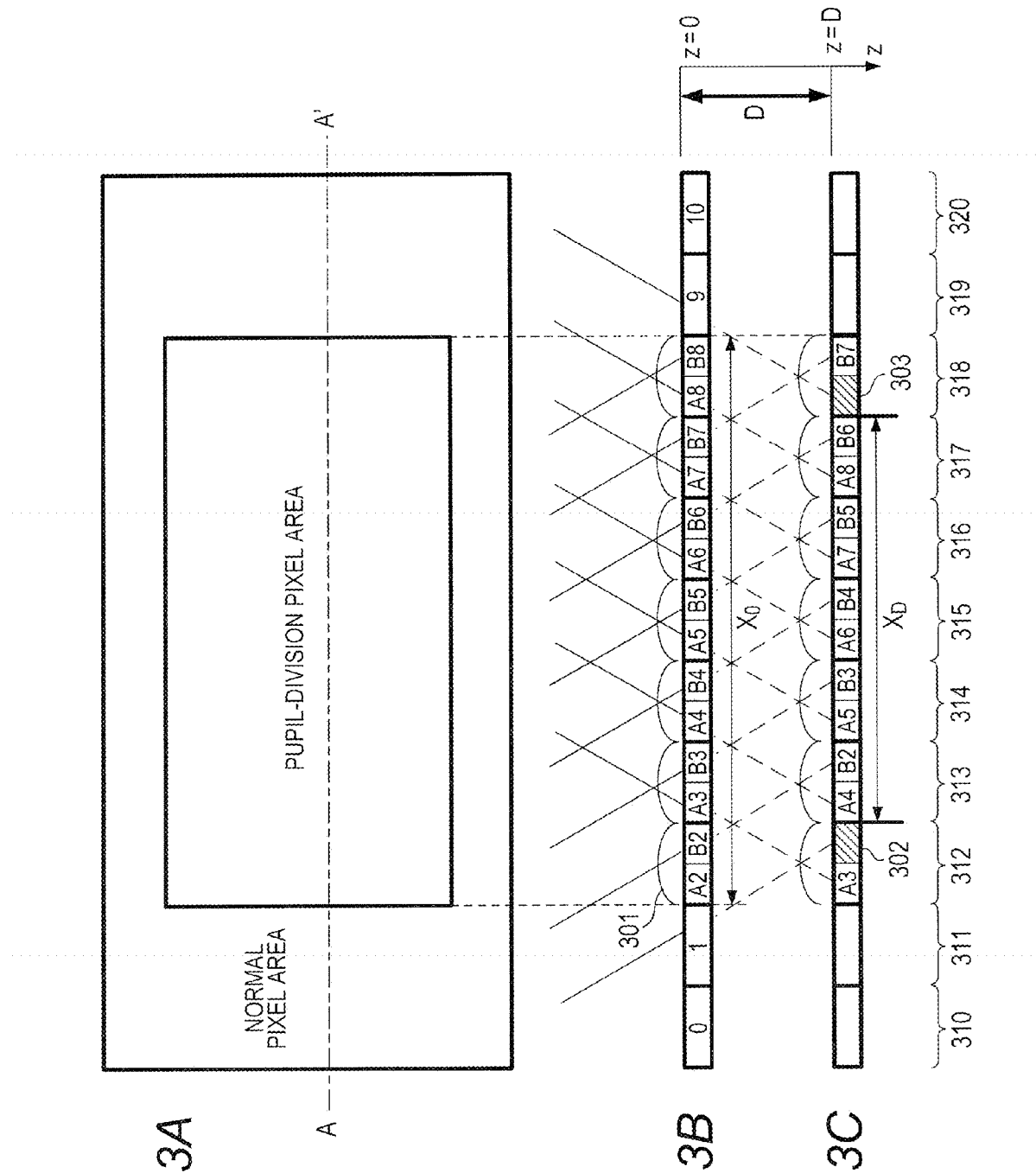

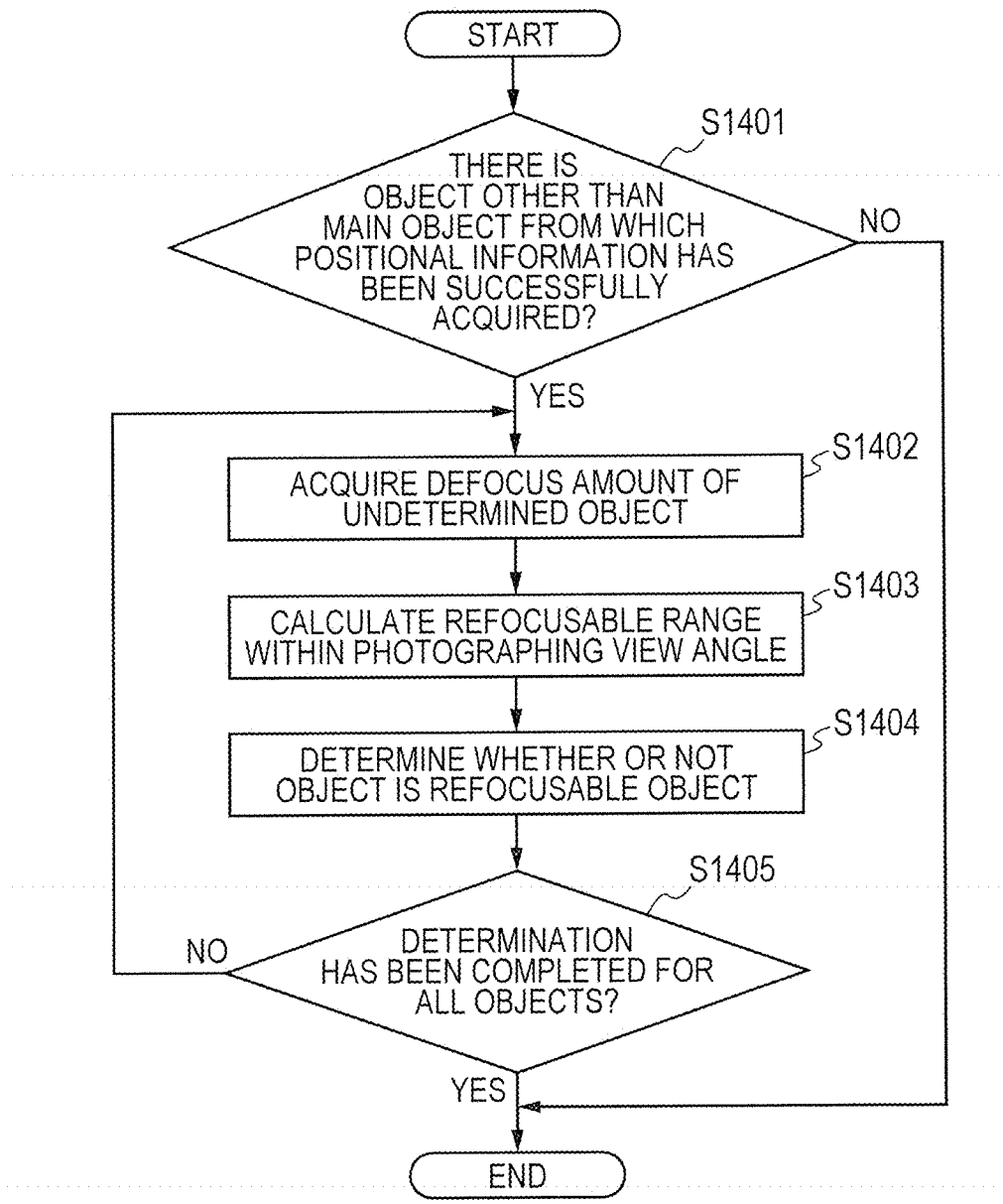

IMAGE PICKUP APPARATUS AND METHOD OF CONTROLLING THE SAME

BACKGROUND OF THE INVENTION

Field of the Invention

The present invention relates to an image pickup apparatus configured to reconstruct a refocused image and a method of controlling the image pickup apparatus.

Description of the Related Art

In image pickup apparatus such as a digital camera, two kinds of methods are known as methods of bringing an object into focus by a user. The first method is a method of adjusting focus by driving a focus lens, called "contrast AF" or "phase detection AF". The second method is a method called "refocusing". The "refocusing" is a technology of generating a refocused image in which an object is in focus in the following manner. Specifically, image signals respectively for pupil-division regions, which are read from an image pickup element, are reconstructed as if an image pickup plane were virtually moved in a fore-and-aft direction. The image signals respectively for the pupil-division regions are added to generate the refocused image in which the object is in focus. By using the refocusing technology, an image photographed so that one object is in focus can be refocused so that another object is brought into focus through image processing after recording.

The following image pickup apparatus is proposed in Japanese Patent Application Laid-Open No. 2014-003404 as a related-art image pickup apparatus using the refocusing technology. Specifically, the related-art image pickup apparatus generates a parameter used to reconstruct the refocused image as metadata of image data based on photographing information of an optical system at the time of photographing. Further, in Japanese Patent Application Laid-Open No. 2014-197824, there is proposed an image processing apparatus configured to inform a user of which object is located within a refocusable depth distance range when the refocused image is to be reconstructed.

However, the related art has the following problem.

When the photographed image is refocused by using the refocusing technology, there is a possibility that the image cannot be refocused depending on a view angle position of the object. This is because a refocusable photographing view angle range (hereinafter referred to simply as "refocusable view angle range") is narrowed when the image pickup plane is virtually moved in the fore-and-aft direction for refocusing the image.

According to the technologies described in Japanese Patent Application Laid-Open No. 2014-003404 and Japanese Patent Application Laid-Open No. 2014-197824, the refocused image is reconstructed based on the refocusable distance range in a depth direction of a photographed image. However, the above-mentioned technologies have a problem in that it is difficult to quickly determine whether or not refocusing for bringing a plurality of objects on the photographed image into focus is possible.

SUMMARY OF THE INVENTION

According to one embodiment of the present invention, there is provided an image pickup apparatus configured to reconstruct a refocused image, including: an acquisition unit configured to acquire an image photographed by using an image pickup element having a pupil-division pixel area together with photographing information of an optical system at a time of photographing; an object detecting unit configured to detect at least one object on the image so as to calculate an object area of the at least one object and calculate an object distance corresponding to a depth distance to the at least one object from a defocus amount in the object area; and a refocusing possibility determining unit configured to determine possibility of refocusing for bringing the at least one object into focus by calculating a refocusable view angle range from the object distance, the object area, and the photographing information and determining whether or not the object area is included in the refocusable view angle range through comparison.

Further features of the present invention will become apparent from the following description of exemplary embodiments with reference to the attached drawings.

BRIEF DESCRIPTION OF THE DRAWINGS

FIG. 2 is a view for illustrating contents of a metadata area, which are recorded on a volatile memory together with an image data area according to the first embodiment of the present invention.

FIGS. 3A, 3B and 3C are diagrams for illustrating distribution of pixels of an image pickup element according to the first embodiment of the present invention.

FIG. 14 is a flowchart of a refocusing possibility determining method in the image pickup method according to the fourth embodiment of the present invention.

DESCRIPTION OF THE EMBODIMENTS

Preferred embodiments of the present invention will now be described in detail in accordance with the accompanying drawings.

First Embodiment

An image pickup apparatus according to a first embodiment of the present invention is described referring to FIG. 1 to FIG. 8. According to the related art described in Japanese Patent Application Laid-Open No. 2014-003404 and Japanese Patent Application Laid-Open No. 2014-197824, a refocused image is reconstructed based on a refocusable distance range in a depth direction of a photographed image. However, a relationship between reduction in refocusable view angle range and a position of an object within a view angle is not taken into consideration. As a result, the technologies described in Japanese Patent Application Laid-Open No. 2014-003404 and Japanese Patent Application Laid-Open No. 2014-197824 cited above have a problem in that it is difficult to quickly determine the possibility of refocusing for bringing a plurality of objects on the photographed image into focus. In view of such a problem, in the first embodiment, there is described a method of quickly determining the possibility of refocusing for bringing the plurality of objects into focus on the photographed image so as to clearly inform a user of the result of determination. Although an edit mode in which refocusing processing is performed on an image photographed by a digital camera to which an image pickup apparatus 100 of the present invention is applied is supposed in the following description, the present invention is not necessarily limited to the edit mode described above.

Figure 1:
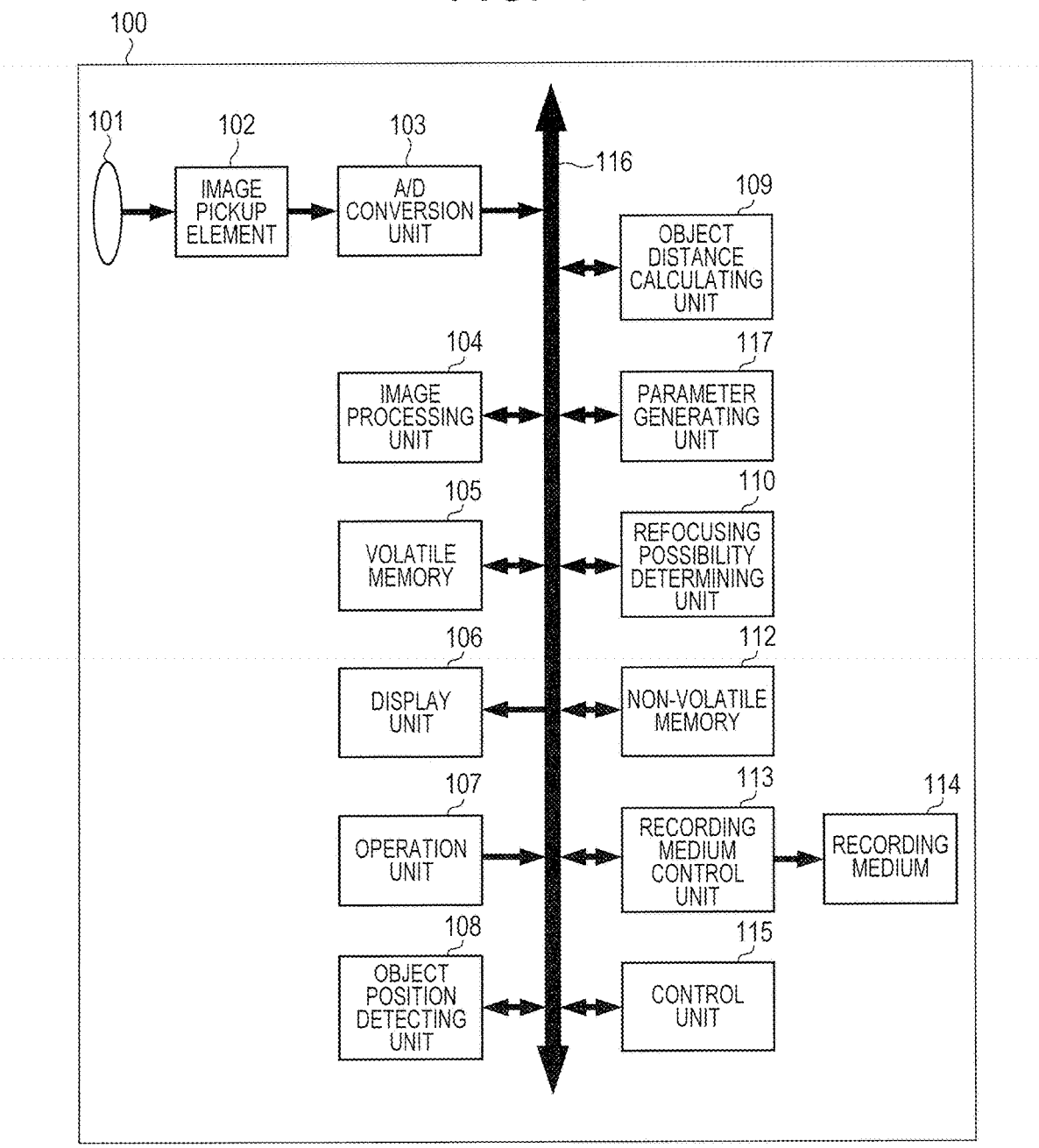
FIG. 1 is a block diagram for illustrating a configuration of an image pickup apparatus according to a first embodiment of the present invention.

FIG. 1 is a block diagram for illustrating a configuration of the image pickup apparatus 100 according to the first embodiment of the present invention.

An optical system 101 includes a plurality of lenses, a lens group, and a diaphragm. The plurality of lenses include a movable focus lens. A control unit 115 drives the focus lens so that focus adjustment of the image pickup apparatus 100 can be performed. Further, the control unit 115 drives the diaphragm so as to adjust an amount of light passing through the optical system 101. As an index of the amount of light allowed to pass therethrough, an F value is used. The F value is calculated by the control unit 115.

An image pickup element 102 is formed of a CMOS or the like, and converts light received by the optical system 101 into electric signals. The control unit 115 transmits the thus converted electric signals to an A/D conversion unit 103. Each pixel in a pupil-division pixel area of the image pickup element 102 has a plurality of pupil-division regions within a single pixel. Therefore, an electric signal is obtained for each of the pupil-division regions. The image pickup element 102 is not required to have the pupil-division regions for all the pixels, and only predetermined pixels may have the pupil-division regions. The A/D conversion unit 103 converts analog image signals transmitted from the image pickup element 102 into digital image signals. The control unit 115 performs control so that the digital image signals converted by the A/D conversion unit 103 are transmitted to an image processing unit 104.

The image processing unit 104 performs arbitrary image processing on the digital image signals transmitted from the A/D conversion unit 103. The image processing includes development processing, color conversion processing, resizing, compression, and refocusing processing using images for the respective pupil-division regions. In particular, in the first embodiment, the image processing unit 104 adds the digital image signals for the respective pupil-division regions to generate a photographed image. Reference positions of the digital image signals are adjusted when the digital image signals for the respective pupil-division regions are added, thereby enabling a refocused image in which an arbitrary object is in focus to be generated. Further, the image processing unit 104 generates a developed image by performing the development processing on the photographed image and further performing arbitrary image processing such as the color conversion processing or the resizing as needed. Further, the image processing includes lossless compression of a RAW image for each of the pupil-division images.

The control unit 115 records the image signal for each of the pupil-division regions, which have been subjected to the arbitrary image processing, in a volatile memory 105. The volatile memory 105 is a DRAM configured to record a temporary image at the time of photographing or the like. The "temporary image at the time of photographing" used herein includes the RAW image for each of the pupil-division regions, which are output from the A/D conversion unit 103, the photographed image obtained by adding the images for the respective pupil-division regions with the image processing unit 104, and the developed image obtained by performing the required arbitrary image processing after the development processing. In this embodiment, the "photographed image" is simply referred to as "image".

FIG. 2 is a view for illustrating contents of a metadata area, which are recorded in the volatile memory 105 together with an image data area according to the first embodiment of the present invention. Metadata is used in the refocusing processing described later, and retains coordinates of an upper left corner and coordinates of a lower right corner of an object area and a parameter formed of a transform matrix used to reconstruct the refocused image for each object.

Data to be written in the image data area and data to be written in the metadata area are recorded in a recording medium 114 when a user instructs to photograph a still image. A data amount of the transform matrix is relatively large. Therefore, in place of the transform matrix, a distance of movement to a virtual imaging plane (details thereof are described later) that is required to generate the transfer matrix may be recorded.

A display unit 106 displays the image data recorded in the volatile memory 105, displays information on the diaphragm and a shutter speed of the optical system 101 in a superimposed manner, and displays positional information of the object in a superimposed manner. Further, when the display unit 106 is a touch panel display, operation icons or the like may be displayed thereon. The user can select the operation icon or a main object desired to be brought into focus through a touch panel operation. Further, information may be displayed in a superimposed manner on a refocusable area, and a refocusable object or an unrefocusable object. Here, the "refocusable object" means an object that can be brought into focus through refocusing, whereas the "unrefocusable object" means an object that cannot be brought into focus through refocusing.

An operation unit 107 includes a release button used by the user to operate the digital camera from the outside, or the like. The user operates the operation unit 107 so as to instruct to record a moving image or photograph a still image. Although a two-stage push button switch is supposed as the release button of this embodiment, the release button is not limited thereto. The release button included in the operation unit 107 is configured to receive an instruction to start an exposure operation, an instruction to perform focus detection, and a photographing instruction from the user. An operation button of the operation unit 107 is configured to receive input on a menu screen and input for switching a photographing mode.

An object position detecting unit 108 detects an area occupied by the object within a photographing view angle on the image recorded in the volatile memory 105, and records the detected area as an object area in the volatile memory 105. For example, it is assumed that the object position detecting unit 108 can detect a central position of a face of the object and a size of the face as an object area. Then, the object position detecting unit 108 calculates coordinates of an upper left corner and coordinates of a lower right corner of the object area so as to specify a position of the object area within a screen. Details of the object position detecting unit 108 are described later. Although it is supposed that a face image is detected as the object area on the image in this embodiment, the object area is not limited thereto. The entire object may be detected in place of the face image. As a method of detecting the object or the face of the object, for example, a template matching method can be used.

An object distance calculating unit 109 calculates object distance information indicating a depth distance to the object. Specifically, the object distance calculating unit 109 first calculates a phase difference between pixels corresponding to the central position of the face of the object in the pupil-division regions of the image recorded in the volatile memory 105. Next, the phase difference is converted into a defocus amount at an in-focus photographing distance so that the in-focus photographing distance and the defocus amount are added to calculate the object distance information. The control unit 115 transmits the result of calculation to a refocusing possibility determining unit 110. As a method of calculating the defocus amount from the phase difference, a known method can be used.

The refocusing possibility determining unit 110 calculates a refocusable range based on the in-focus photographing distance, the F value, the object position (object area) information, and the object distance information so as to determine whether or not the object is included in the refocusable range. Here, there are two kinds of refocusable ranges. The first one is a refocusable view angle range in a photographing view angle direction, which is calculated from the object distance calculated in the object distance calculating unit 109. The second one is a refocusable distance range in the depth direction, which is calculated from the object position information detected in the object position detecting unit 108. In this embodiment, a method using the refocusable view angle range is described.

The refocusing possibility determining unit 110 determines whether or not the object is a refocusable object based on an inclusion relationship between the refocusable view angle range and the object area calculated by the object position detecting unit 108. A specific method of calculating the refocusable view angle range is described later.

A non-volatile memory 112 retains a sequence program for allowing the control unit 115 to control operations of the units of the image pickup apparatus 100. The non-volatile memory 112 also retains the transform matrix that is used to reconstruct the refocused image described later in association with a distance from a position of the image pickup element 102 at the time of imaging to the virtual imaging plane. A recording medium control unit 113 performs control for reading and writing data from/to the recording medium 114 such as a memory card or a hard disk in accordance with an instruction from the control unit 115.

The recording medium 114 is a medium configured to record a photographed image, and is formed of a hard disk or a memory card containing a semiconductor memory therein. In the storage medium 114, data that is obtained by losslessly compressing the RAW image for each of the pupil-division regions can also be stored. The control unit 115 controls each of the blocks connected by a bus 116. Further, the control unit 115 controls the optical system 101 and generates the refocused image from the image recorded in the volatile memory 105. The optical system 101 is controlled by using, for example, a contrast AF technique. The control unit 115 loads the program from the FROM included in the volatile memory 105 and executes the loaded program, thereby performing control on the respective units.

The bus 116 is a large-capacity high-speed transmission line based on a known protocol and connects modules. When the refocusing possibility determining unit 110 determines that the refocusing of the image, for bringing the object into focus, is impossible, a parameter generating unit 117 replaces the transform matrix with a null matrix so that the null matrix is recorded in the metadata area of the volatile memory 105 in association with the corresponding object. Details of processing performed by the parameter generating unit 117 are described later. The configuration of the image pickup apparatus 100 described referring to FIG. 1 is merely an example. Therefore, the configuration of the image pickup apparatus 100 according to the present invention is not limited to that illustrated in FIG. 1 as long as an operation described below can be implemented.

Next, referring to FIG. 3A to FIG. 4B, details of the refocusing possibility determining unit 110 and the parameter generating unit 117 are described. FIG. 3A is a diagram for illustrating distribution of pixels of the image pickup element 102 according to the first embodiment of the present invention. In a central portion of FIG. 3A, a pupil-division pixel area that is pupil-divided so as to detect an image deviation amount is provided. In a portion that surrounds the pupil-division pixel area, a normal pixel area that is not pupil-divided is provided.

FIG. 3B is a sectional view taken along the line A-A' in FIG. 3A, for illustrating a state in which a light beam that has passed through the optical system 101 illustrated in FIG. 1 passes through a microlens 301 to form an image on the image pickup element 102. The image pickup element 102 exemplified in FIG. 3B includes eleven pixels 310 to 320 arranged in a horizontal direction. The pixels 310, 311, 319, and 320 are pixels in the normal pixel area, whereas the pixels 312 to 318 are pixels in the pupil-divided pixel area. In FIG. 3B, a direction of movement of the virtual imaging plane for reconstructing the refocused image is illustrated as a z direction.

In order to reconstruct the refocused image for another object in focus by using the image data imaged on an actual imaging plane at z=0 illustrated in FIG. 3B, it is only necessary to obtain light beams to be input to the virtual imaging plane indicated by the broken lines in FIG. 3C, which are obtained through movement in the z axis direction by a distance D. However, the light beam that enters a B-image region 302 of the pixel 312 on the virtual imaging plane illustrated in FIG. 3C enters the pixel 311 that is not subjected to the pupil division on the actual imaging plane illustrated in FIG. 3B. Therefore, in practice, information corresponding to an image B in the B-image region 302 of the pixel 312 on the virtual imaging plane cannot be obtained. Thus, the refocused image cannot be reconstructed at the pixel 312.

Similarly, the light beam that enters an A-image region 303 of the pixel 318 in FIG. 3C enters the pixel 319, which is not subjected to the pupil division, on the actual imaging plane illustrated in FIG. 3B. Therefore, in practice, the information corresponding to an image A in the A-image region 303 of the pixel 318 on the virtual imaging plane cannot be obtained. Therefore, the refocused image cannot be reconstructed at the pixel 318. As a result, the refocusable view angle range on the virtual imaging plane distant from the imaging plane by the distance D is reduced from $X_0$ to $X_D$. When the virtual imaging plane further separates from the actual imaging plane, the refocusable view angle range is further reduced. In this manner, the refocusable view angle range changes in accordance with the object distance to the object that is a focusing target for refocusing. Further, the refocusable view angle range also changes also when an incident angle of incident light changes in accordance with the F value of the optical system 101.

In FIG. 3A to FIG. 3C, the pixel in the pupil-division pixel area has two pupil-division regions in the horizontal direction. However, a pattern of the pupil-division regions is not limited thereto. For example, the pupil-division regions may be arranged in a vertical direction, or the pixel may have three or more pupil-division regions. When the pupil-division regions are arranged in the vertical direction, the refocusable view angle range is reduced in the vertical direction.

Next, the transform matrix is described. A virtual output value S313 of the pixel 313 of the image pickup element 102 at z=D illustrated in FIG. 3C is expressed by Expression (1) described below.

$$S313 = A4 + B2 \quad (1)$$

Similarly, virtual output values S310 to S320 of the pixels 310 to 320 at z=D, which are illustrated in FIG. 3C, are expressed by Expression (2) obtained by generalizing Expression (1).

$$\begin{bmatrix} S310 \\ S311 \\ S312 \\ S313 \\ S314 \\ S315 \\ S316 \\ S317 \\ S318 \\ S319 \\ S320 \end{bmatrix} = \begin{bmatrix} 0&0&0&0&0&0&0&0&0&0&0&0&0 \\ 0&0&0&0&0&0&0&0&0&0&0&0&0 \\ 0&0&0&0&0&0&0&0&0&0&0&0&0 \\ 0&1&0&0&1&0&0&0&0&0&0&0&0 \\ 0&0&0&1&0&0&1&0&0&0&0&0&0 \\ 0&0&0&0&0&1&0&0&1&0&0&0&0 \\ 0&0&0&0&0&0&1&0&0&1&0&0&0 \\ 0&0&0&0&0&0&0&0&1&0&0&1&0 \\ 0&0&0&0&0&0&0&0&0&0&0&0&0 \\ 0&0&0&0&0&0&0&0&0&0&0&0&0 \\ 0&0&0&0&0&0&0&0&0&0&0&0&0 \end{bmatrix} \begin{bmatrix} A2 \\ B2 \\ A3 \\ B3 \\ A4 \\ B4 \\ A5 \\ B5 \\ A6 \\ B6 \\ A7 \\ B7 \\ A8 \\ B8 \end{bmatrix} \quad (2)$$

Specifically, when a position z of the virtual imaging plane is obtained, pixel output values of the reconstructed image can be calculated by computing a transform matrix M expressed by Expression (3), which is prepared in advance in the non-volatile memory 112 illustrated in FIG. 1, for pupil-division pixel outputs arranged in a column. Further, the number of pixels that are present outside of the refocusable view angle range can be obtained from the number of rows, each including zero for all the elements, in the transform matrix M expressed by Expression (3). For example, in the transform matrix M expressed by Expression (3), three leftmost pixels and three rightmost pixels correspond to the pixels that are present outside of the refocusable view angle range.

$$M = \begin{bmatrix} 0&0&0&0&0&0&0&0&0&0&0&0&0 \\ 0&0&0&0&0&0&0&0&0&0&0&0&0 \\ 0&0&0&0&0&0&0&0&0&0&0&0&0 \\ 0&1&0&0&1&0&0&0&0&0&0&0&0 \\ 0&0&0&1&0&0&1&0&0&0&0&0&0 \\ 0&0&0&0&0&1&0&0&1&0&0&0&0 \\ 0&0&0&0&0&0&1&0&0&1&0&0&0 \\ 0&0&0&0&0&0&0&0&1&0&0&1&0 \\ 0&0&0&0&0&0&0&0&0&0&0&0&0 \\ 0&0&0&0&0&0&0&0&0&0&0&0&0 \\ 0&0&0&0&0&0&0&0&0&0&0&0&0 \end{bmatrix} \quad (3)$$

Figure 4A:
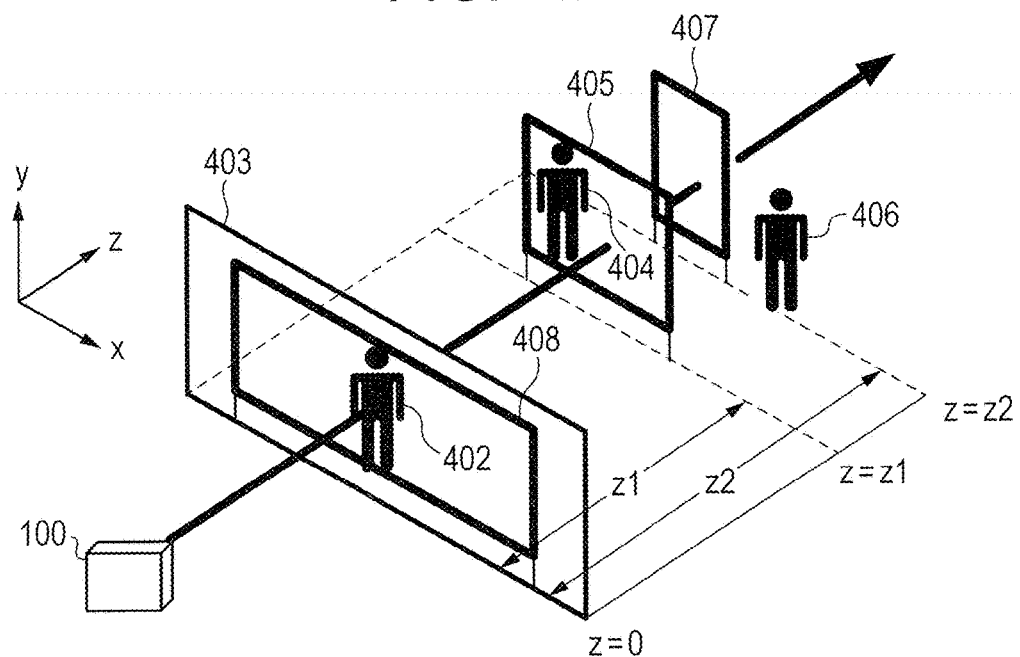
FIGS. 4A and 4B are views for illustrating a relationship between a distance from a main object in focus and an object being a focusing target for refocusing and a refocusable view angle range.
Figure 4B:
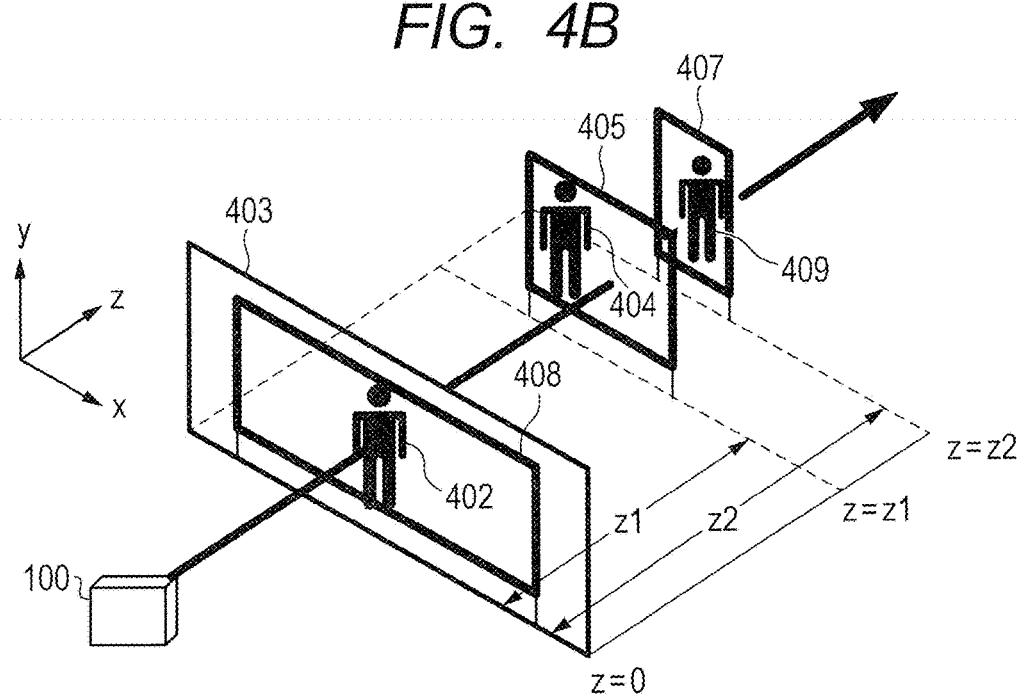

FIG. 4A and FIG. 4B are views for illustrating a relationship between a distance from a main object 402 in focus to an object being a focusing target for refocusing and the refocusable view angle range. In both FIG. 4A and FIG. 4B, the image pickup apparatus 100 is focused on the main object 402 with a full photographing view angle 403. The photographing view angle 403 includes a photographing view angle 408 obtained based on the pupil-division pixels. In this case, a horizontal direction of the photographing view angle 403 is an x-axis direction, a vertical direction is a y-axis direction, and a depth direction is a z-axis direction. An object 404 is located at a position that is away from the main object 402 by a distance z1 in the z-axis direction. An object 406 illustrated in FIG. 4A and an object 409 illustrated in FIG. 4B are respectively located at a position away from the main object 402 by a distance z2. The amount of movement of the virtual imaging plane, which is required to bring the object away from the main object 402 by the distance z1 into focus, is defined as D1, and the amount of movement of the virtual imaging plane, which is required to bring the object away from the main object 402 by the distance z2 into focus, is defined as D2. At this time, refocusable view angle ranges 405 and 407 illustrated in FIG. 4A are obtained from the number of rows, each including the elements being not all zero, in transform matrices respectively corresponding to the amount of movement D1 and the amount of movement D2.

In FIG. 4A, the object 404 falls within the refocusable view angle range 405. Therefore, the object 404 can be brought into focus for the reconstruction of the refocused image. On the other hand, the object 406 is out of the refocusable view angle range 407. Therefore, the object 406 cannot be brought into focus for the reconstruction of the refocused image. In this embodiment, the elements of the transform matrix are zero in a region outside of the refocusable view angle range. Therefore, the refocused image in the region is black. On the other hand, in FIG. 4B, both the objects 404 and 409 respectively fall within the refocusable view angle ranges 405 and 407. Therefore, the objects 404 and 409 can be brought into focus for the reconstruction of the refocused image. As described above, the refocusing possibility determining unit 110 determines the refocusable view angle range. The parameter generating unit 117 generates the transform matrix as a parameter necessary for the refocusing of the image.

Figure 5A:
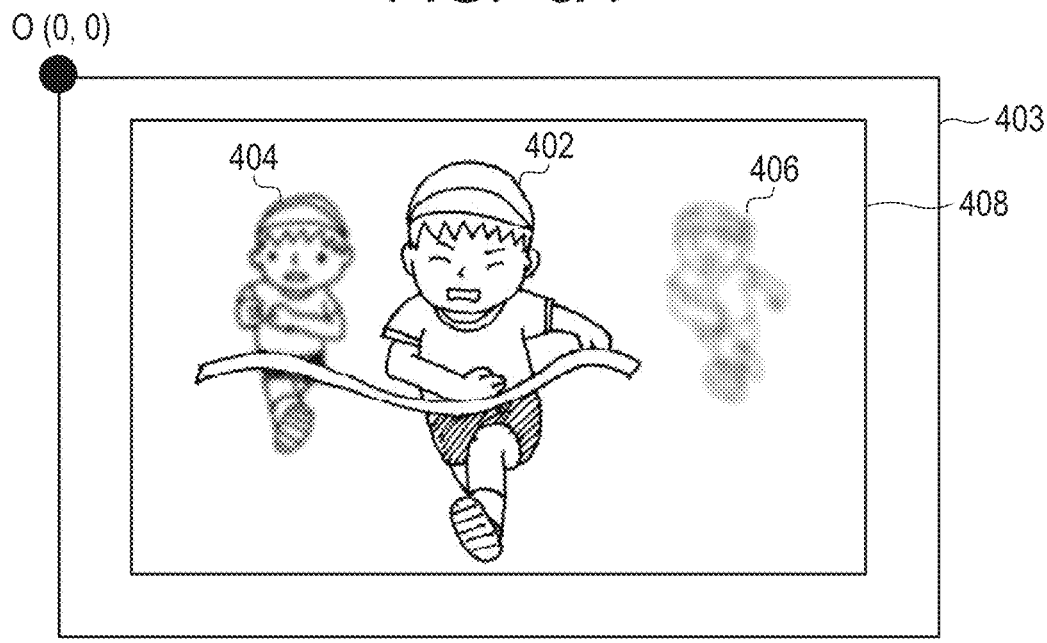
FIG. 5A is a view for illustrating an example of objects on an image photographed by the image pickup apparatus according to the first embodiment of the present invention.

Next, a method of determining possibility of refocusing is described referring to FIG. 5A to FIG. 5E. FIG. 5A is a view for illustrating an example of objects on an image photographed by the image pickup apparatus 100 according to the first embodiment of the present invention. FIG. 5A is a view for illustrating a live-view image provided when the image pickup apparatus 100 performs photographing, which is displayed on the display unit 106 illustrated in FIG. 1 at a resolution of 1,920×1,080. On the display unit 106 illustrated in FIG. 5A, the three objects 402, 404, and 406 illustrated in FIG. 4A are displayed. The image pickup apparatus 100 is focused on the main object 402. Similarly to FIG. 4A and FIG. 4B, the full photographing view angle 403, the distance z1 from the main object 402 to the object 404, the distance z2 from the main object 402 to the object 406, and the photographing view angle 408 obtained based on the pupil-division pixels are illustrated in FIG. 5A to FIG. 5E.

Figure 5B:
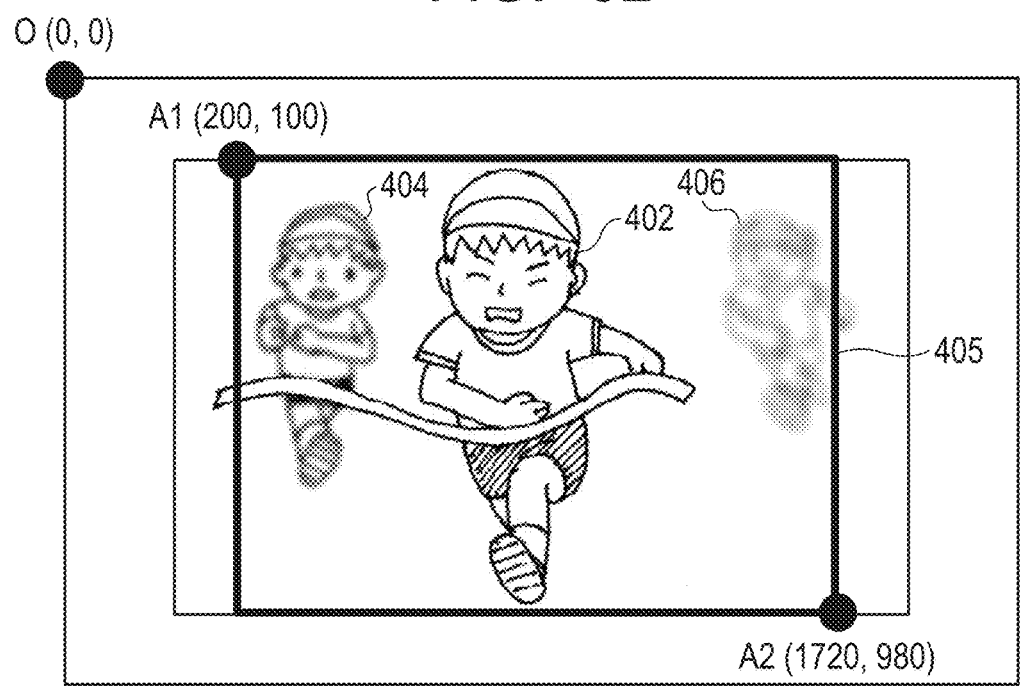
FIG. 5B is a first view for illustrating a method of calculating the refocusable view angle range according to the first embodiment of the present invention.

FIG. 5B is a first view for illustrating a method of calculating the refocusable view angle range according to the first embodiment of the present invention. In FIG. 5B, there is illustrated the refocusable view angle range 405 at a position of the object 404 located away from the main object 402 by the distance z1, which is calculated by the refocusing possibility determining unit 110 illustrated in FIG. 1. Coordinates of an upper left corner of the refocusable view angle range 405 with respect to a point of origin O are calculated as A1(200, 100), and coordinates of a lower right corner of the refocusable view angle range 405 are calculated as A2(1720, 980).

Figure 5C:
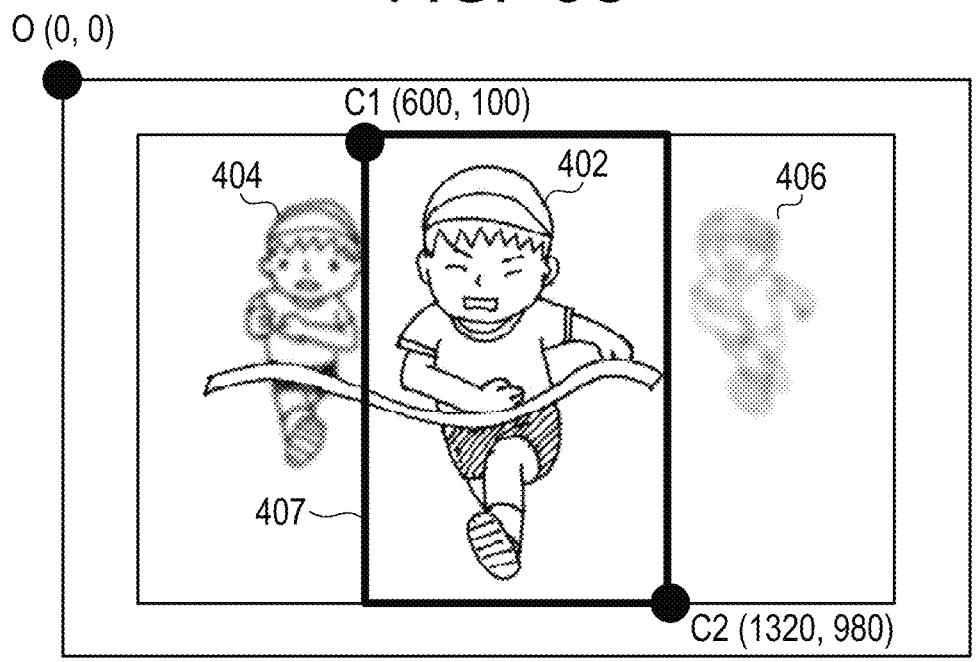
FIG. 5C is a second view for illustrating a method of calculating the refocusable view angle range according to the first embodiment of the present invention.

Further, FIG. 5C is a second view for illustrating a method of calculating the refocusable view angle range according to the first embodiment of the present invention. In FIG. 5C, there is illustrated the refocusable view angle range 407 at a position of the object 406 located away from the main object 402 by the distance z2, which is calculated by the refocusing possibility determining unit 110. Coordinates of an upper left corner of the refocusable view angle range 407 with respect to the point of origin O are calculated as C1(600, 100), and coordinates of a lower right corner of the refocusable view angle range 407 are calculated as C2(1320, 980).

Figure 5D:
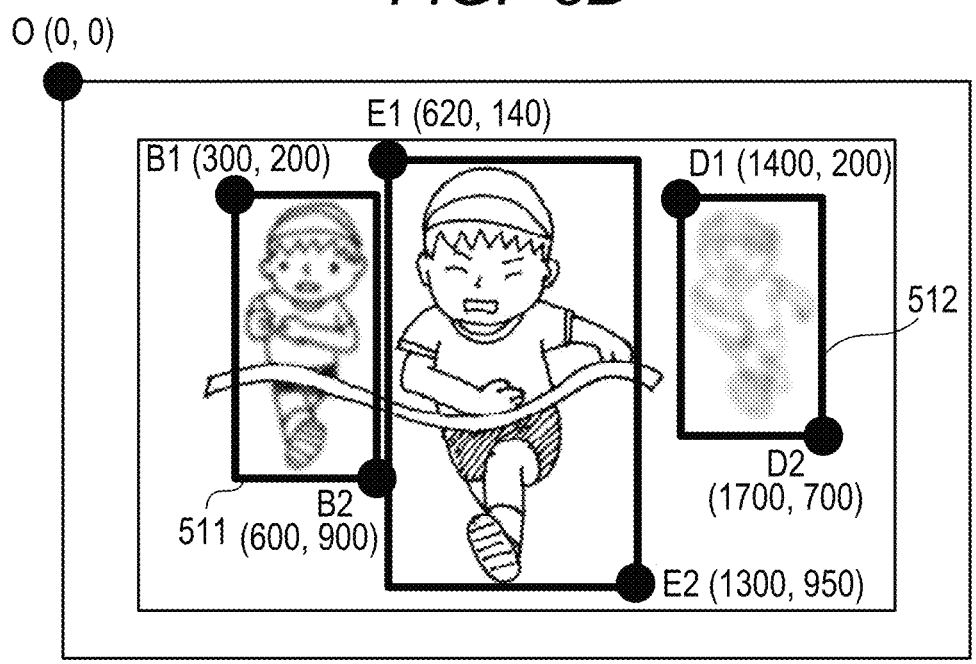
FIG. 5D is a view for illustrating an operation of an object position detecting unit according to the first embodiment of the present invention.

FIG. 5D is a view for illustrating an operation of the object position detecting unit 108 according to the first embodiment of the present invention. The object position detecting unit 108 illustrated in FIG. 1 calculates, for example, coordinates of an upper left corner and coordinates of a lower right corner of a minimum rectangle containing the detected object therein. In FIG. 5D, there are illustrated an object area 511 containing the object 404 detected by the object position detecting unit 108 and an object area 512 containing the object 406. Here, coordinates of an upper left corner of the object area 511 are calculated as B1(300, 200), and coordinates of a lower right corner of the object area 511 are calculated as B2(600, 900). Further, coordinates of an upper left corner of the object area 512 are calculated as D1(1400, 200), and coordinates of a lower right corner of the object area 512 are calculated as D2(1700, 700).

Figure 5E:
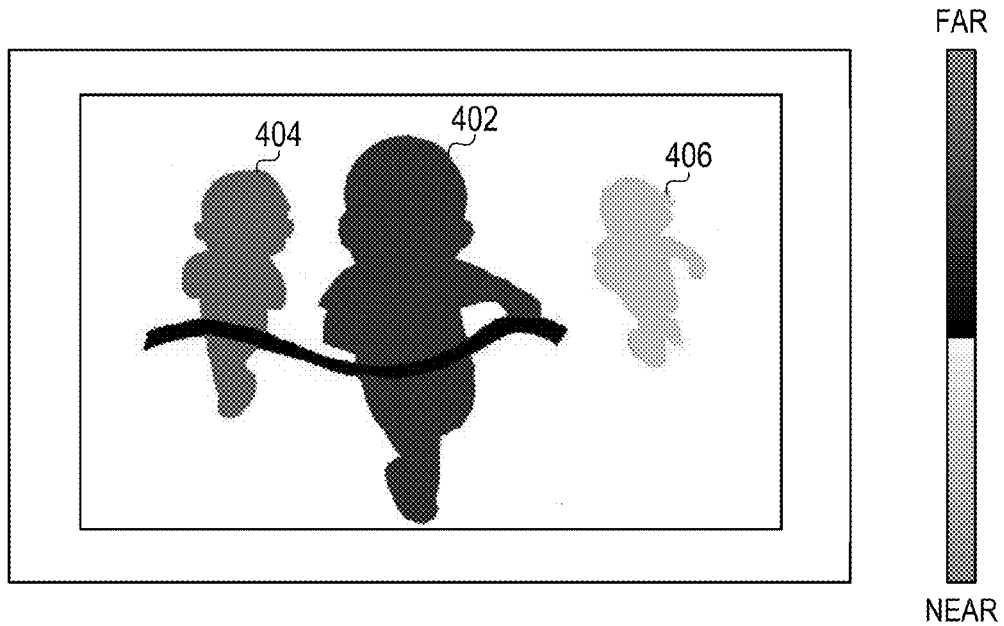
FIG. 5E is a view for illustrating an operation of an object distance calculating unit according to the first embodiment of the present invention.

FIG. 5E is a view for illustrating an operation of the object distance calculating unit 109 according to the first embodiment of the present invention. The object distance calculating unit 109 illustrated in FIG. 1 calculates an object distance to the object which is detected by the object position detecting unit 108 by using a known method. In FIG. 5E, distances to the objects 402, 404, and 406, which are calculated by the object distance calculating unit 109, are indicated at different grayscale so that the closer object is illustrated with darker color. A relationship between the object distances to the respective objects is expressed as: object 402<object 404<object 406.

The refocusing possibility determining unit 110 determines whether or not the object area falls within the refocusable view angle range by obtaining an inclusion relationship of coordinates of two corner points of the refocusable view angle range and coordinates of two corner points of the object area. Further, the refocusing possibility determining unit 110 records the result of determination in the metadata area secured in the volatile memory 105 in association with the object as illustrated in FIG. 2. In FIG. 2, the result of determination made by the refocusing possibility determining unit 110 is recorded in the form of the transform matrix M. Specifically, the result of determination is indicated based on whether or not the transform matrix M is a null matrix. However, a method of recording the result of determination is not limited thereto. For example, the parameter may be unrecorded for an object that is determined as unrefocusable by the refocusing possibility determining unit.

Figure 6:
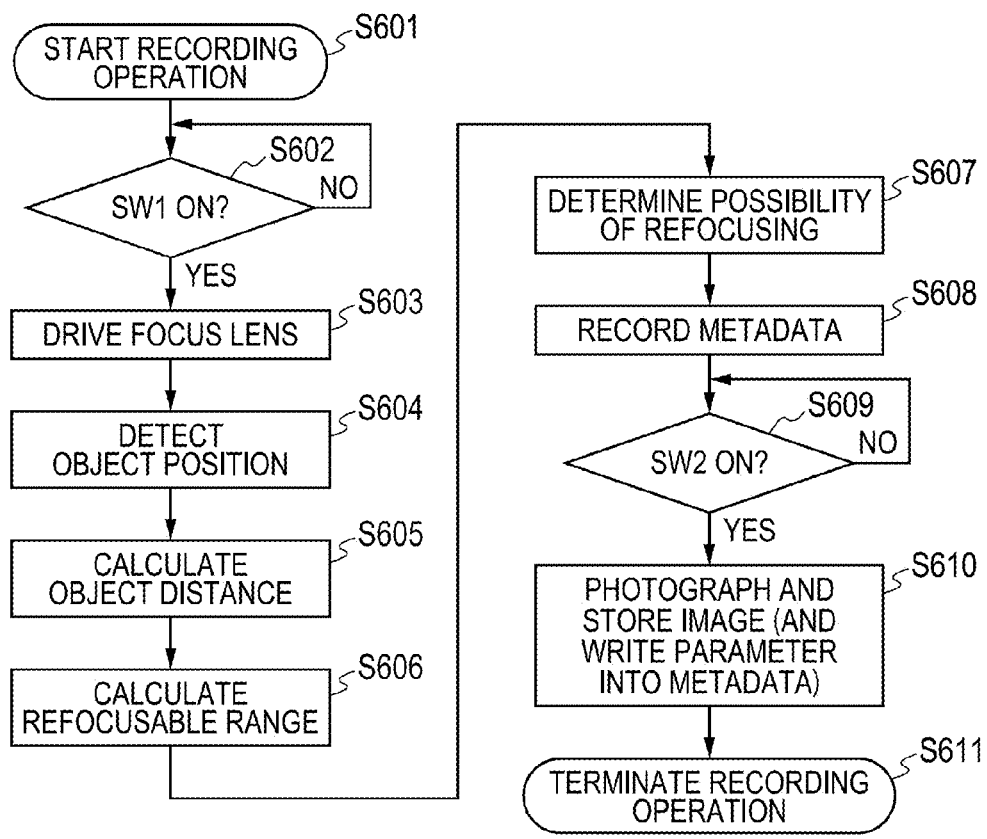
FIG. 6 is a flowchart of a still-image recording operation in an image pickup method according to the first embodiment of the present invention.

FIG. 6 is a flowchart of a still-image recording operation in an image pickup method according to the first embodiment of the present invention. In Step S601, the image pickup apparatus 100 starts an operation in a still-image recording mode. In Step S602, the control unit 115 waits until a photographing preparation operation is performed by a user through pressing the release button included in the operation unit 107 halfway (turning on a switch SW1). Here, the photographing preparation operation corresponds to a focus detecting operation (AF operation) for the main object 402. Further, it is assumed that the switch SW1 is turned on when the release button of the operation unit 107 is pressed halfway and a switch SW2 is turned on when the release button is pressed fully down. The control unit 115 waits until the switch SW1 is turned on (the release button is pressed halfway) by the user. When the switch SW1 is turned ON, the operation proceeds to Step S603.

In Step S603, the user touches the display unit 106 of the image pickup apparatus 100, such as the touch panel, with a finger so as to directly specify the main object 402 corresponding to a target to be brought into focus from the detected objects. The control unit 115 drives the focus lens so as to bring the specified main object 402 into focus, thereby completing the AF operation. In Step S604, the object position detecting unit 108 calculates, as the object areas of the respective objects, coordinates of upper left corners and coordinates of lower right corners of rectangular areas (E1, E2, B1, B2, D1, and D2 illustrated in FIG. 5D) respectively containing the detected objects in the image data. The object areas of the respective objects are recoded in the metadata area secured in the volatile memory 105 in association with the objects. At this time, as illustrated in FIG. 2, information relating to the main object 402 that is instructed to be brought into focus in Step S603 is arranged on the top.

In Step S605, the object distance calculating unit 109 obtains the distance information as illustrated in FIG. 5E for each of the objects and records the obtained distance information in the volatile memory 105. In Step S606, the parameter generating unit 117 reads the object distance information for each of the object areas from the volatile memory 105 illustrated in FIG. 1 so as to calculate the amount of movement to the virtual imaging plane, which is required to bring each of the objects into focus through refocusing. Then, the transform matrix corresponding to the amount of movement is read from the non-volatile memory 112. The refocusing possibility determining unit 110 calculates the refocusable view angle range for each of the objects from the thus read transform matrix in accordance with Expression (2). Further, coordinates of an upper left corner and coordinates of a lower right corner of the calculated refocusable view angle range (A1 and A2 in FIG. 5B and C1 and C2 in FIG. 5C) are calculated.

In Step S607, the refocusing possibility determining unit 110 determines whether or not the refocusing for bringing each of the objects into focus is possible based on the inclusion relationship between the coordinates of each of the object areas calculated in Step S604 and the coordinates of the refocusable view angle range for each of the objects, which are calculated in Step S606. Specifically, as illustrated in FIG. 5D, the coordinates of the upper left corner and the lower right corner of the object area of the object 404 are (B1, B2), and the coordinates of the upper left corner and the lower right corner of the object area of the object 406 are (D1, D2). Further, as illustrated in FIG. 5B and FIG. 5C, the coordinates of the upper left corner and the lower right corner of the refocusable view angle range of the object 404 are (A1, A2), and the coordinates of the upper left corner and the lower right corner of the refocusable view angle range of the object 406 are (C1, C2). The refocusing possibility determining unit 110 determines whether or not Expression (4) is satisfied for the object 404. Further, the refocusing possibility determining unit 110 determines whether or not Expression (5) is satisfied for the object 406.

$$A1 \leq B1 \text{ and } B2 \leq A2 \quad (4)$$

$$C1 \leq D1 \text{ and } D2 \leq C2 \quad (5)$$

Here, it is assumed that A1 indicates both an x coordinate and a y coordinate of the corner point A1. In this embodiment, Expression (4) is satisfied, whereas Expression (5) is not satisfied. Therefore, the object 404 is determined as refocusable, whereas the object 406 is determined as unrefocusable. After the determination, the operation proceeds to Step S608.

In Step S608, the parameter generating unit 117 records the metadata in the volatile memory 105 based on the result of determination in Step S607. Specifically, for the object that is determined as being present outside of the refocusable view angle range in Step S607, the elements in the corresponding transform matrix that is read in Step S606 are replaced by the null matrix. Then, the transform matrix whose elements are replaced by the null matrix is recorded together with the coordinates of the upper left corner and the coordinates of the lower right corner of the object area in the metadata area secured in the volatile memory 105 for each of the objects. On the other hand, for the object that is determined as being present within the refocusable view angle range in Step S607, the corresponding transform matrix read in Step S606 is recorded in the metadata area.

For example, in FIG. 5C according to this embodiment, the object 406 is determined as unrefocusable. Therefore, for a transform matrix M3 illustrated in FIG. 2, which is to be used for the reconstruction of the refocused image of the object 406, the null matrix is used so that the refocused image is not reconstructed.

In Step S609, the control unit 115 waits until the switch SW2 is turned on (the release button is fully pressed down) by the user. When the switch SW2 is turned ON, the operation proceeds to Step S610.

In Step S610, the recording medium control unit 113 adds the parameter (metadata generated in Step S608) for reconstructing the refocused image to the image data acquired by photographing, and records the resultant in the recording medium 114. Further, the image processing unit 104 generates display image data from the image data acquired by the photographing, and records the generated display image data in the recording medium 114. Thereafter, the still-image recording operation is terminated in Step S611.

Figure 7:
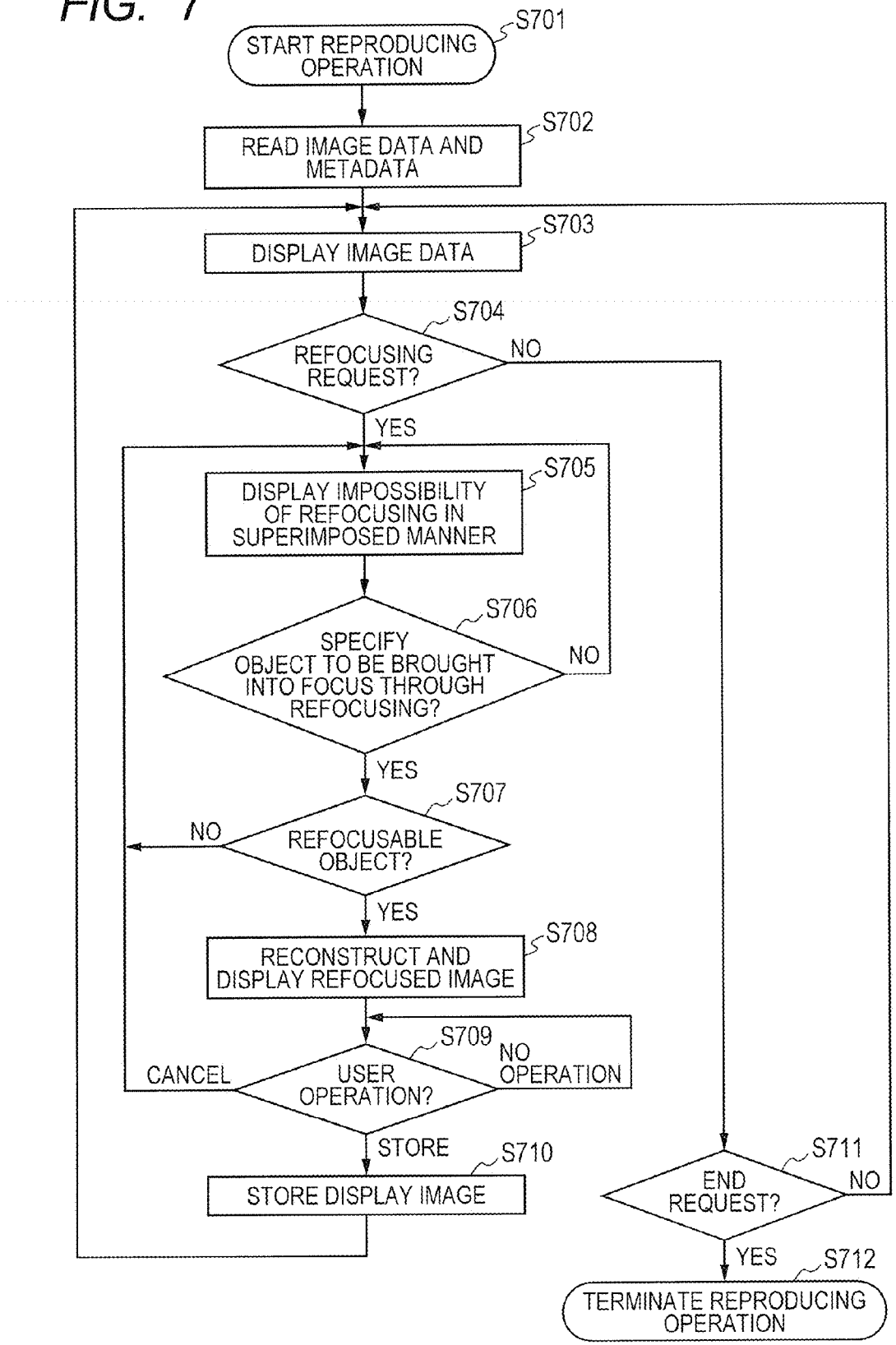
FIG. 7 is a flowchart of a still-image reproducing operation in the image pickup method according to the first embodiment of the present invention.
Figure 8:
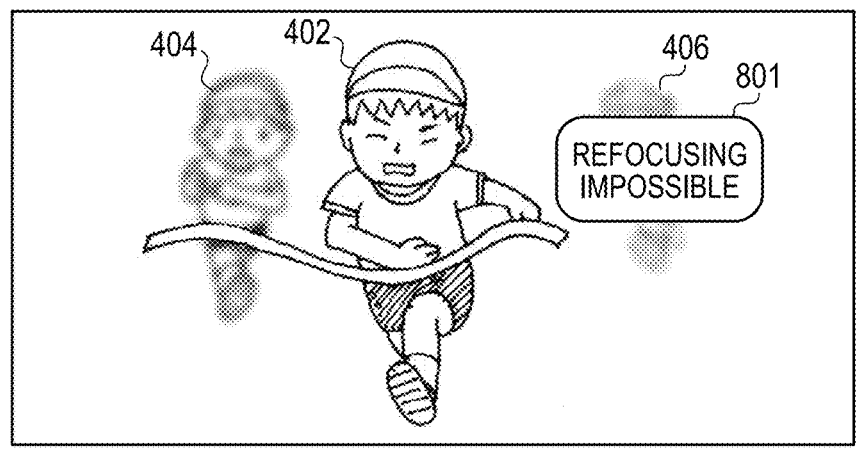
FIG. 8 is a view for illustrating an example of display for an unrefocusable object in the image pickup method according to the first embodiment of the present invention.

FIG. 7 is a flowchart of a still-image reproducing operation in the image pickup method according to the first embodiment of the present invention. Further, FIG. 8 is a view for illustrating an example of display for the unrefocusable object in the image pickup method according to the first embodiment of the present invention. In Step S701, the control unit 115 waits until a reproduction button included in the operation unit 107 is pressed down. When the reproduction button is pressed down, the operation proceeds to Step S702.

In Step S702, the control unit 115 reads the image data, and the metadata and the display image data therefor from the recording medium 114, and writes the read data in the volatile memory 105. In Step S703, the control unit 115 displays the display image data read in Step S702 on the display unit 106. Alternatively, when the refocusing has been already performed for another object, the display image data that is generated in the previous refocusing processing is displayed.

In Step S704, the control unit 115 determines whether or not an instruction to switch to the edit mode for reconstructing the refocused image has been made by a direct instruction from the user through the display unit 106 or through the operation of the operation button included in the operation unit 107. When the instruction to switch to the edit mode has been made, the operation proceeds to Step S705. When the instruction to switch to the edit mode has not been made, the operation proceeds to Step S711.

In Step S705, the control unit 115 verifies whether or not each of the objects included in the image displayed in Step S703 is a refocusable object. Specifically, when the transform matrix associated with each of the objects is the null matrix, an object is determined as unrefocusable. When the unrefocusable object is included in the image, impossibility of refocusing is notified to the user by, for example, superimposing a message 801 as illustrated in FIG. 8 on the image.

In Step S706, the control unit 115 waits until the object for which the refocused image is reconstructed is specified by a direct instruction made by the user through the display unit 106 or through an operation of the operation button included in the operation unit 107. After the object is specified by the user, the operation proceeds to Step S707. In Step S707, the refocusing possibility determining unit 110 determines whether or not the refocusing for bringing the object specified as a focusing target for refocusing is possible. Specifically, the transform matrix associated with the specified object, which is contained in the metadata read in Step S702, is verified. When the transform matrix is the null matrix, the object is determined as unrefocusable. Then, the operation returns to Step S705. At this time, the refocusing processing is not performed. On the other hand, when the transform matrix is not the null matrix, the object is determined as refocusable. Then, the operation proceeds to Step S708. At this time, the message 801 illustrated in FIG. 8, which is displayed in Step S705, is erased.

In Step S708, the image processing unit 104 reconstructs the refocused image of the object specified in Step S706. Specifically, the refocusing processing is performed for the specified object in accordance with Expression (2) by using the transform matrix associated with the object, which is contained in the metadata read in Step S702.

Here, on a scene illustrated in FIG. 4B, the refocusing is performed on the image data that is obtained with the main object 402 being in focus so as to bring the object 409 distant from the main object 402 by the distance z2 into focus after the refocusing is performed so as to bring the object 404 distant from the main object 402 by the distance z1 into focus. In this case, in Step S703, an image obtained when the object 404 is brought into focus through the refocusing is displayed. When the refocused image is generated, the image before the refocusing, which is read in Step S702, is reconstructed. As a result, reduction in view angle of the display image data through repetition of the refocusing processing can be prevented. After the refocusing processing, the image processing unit 104 generates the display image data from the reconstructed refocused image and displays the display image data on the display unit 106.

In Step S709, the control unit 115 waits until an instruction for the reconstructed refocused image is issued by a direct instruction made by the user through the display unit 106 or through the operation of the operation button included in the operation unit 107. When a storage instruction is made, the operation proceeds to Step S710. When an instruction to cancel the refocusing processing is made, the operation proceeds to Step S705.

In Step S710, the image processing unit 104 performs the image processing on the reconstructed refocused image to generate the display image data. Then, the refocused image and the display image data are stored in the recording medium 114. Thereafter, the operation returns to Step S703.

In Step S711, when a power button included in the operation unit 107 is pressed down by the user so as to make an end request, the control unit 115 proceeds to Step S712 to terminate the still-image reproducing operation according to this embodiment. When the end request is not made, the operation returns to Step S703.

Although the digital camera has been described as the image pickup apparatus 100 of the present invention by way of example, the image pickup apparatus 100 is not limited thereto. For example, the image pickup apparatus of the present invention may be a camera configured to output the image data and the metadata to the outside so as to record the image data and the metadata.

As described above, in this embodiment, the image pickup apparatus includes an acquisition unit (image pickup element, A/D conversion unit) configured to acquire the image photographed by using the image pickup element having the pupil-division pixel area together with the photographing information of the optical system at the time of photographing. Further, the image pickup apparatus includes an object detecting unit (object position detecting unit, object distance calculating unit) configured to calculate the object area of the object and calculate the object distance corresponding to the depth distance to the object. Still further, the image pickup apparatus includes the refocusing possibility determining unit (refocusing possibility determining unit) configured to determine the possibility of refocusing for bringing the object into focus by calculating the refocusable view angle range and determining whether or not the object area falls within the refocusable view angle range through comparison. In this manner, the possibility of refocusing can be quickly determined for each of the objects located at different view angle positions on the photographed image.

Still further, in this embodiment, the image pickup apparatus includes the parameter generating unit (parameter generating unit) configured to generate the parameter necessary for the refocusing of the image so as to bring the object into focus in association with the object based on the photographing information. Still further, the image pickup apparatus includes a recording unit (recording medium control unit) configured to record the result of determination made by the refocusing possibility determining unit and the parameter as the metadata of the image together with the image in the recording medium. Still further, the image pickup apparatus includes a reproducing unit (image processing unit, recording medium control unit) configured to read the image and the metadata recorded in the recording medium to refocus the image so as to bring the object into focus. Still further, the image pickup apparatus includes the display unit (display unit) configured to display on the image whether or not the refocusing for bringing the object into focus is possible based on the metadata. In this manner, the user can be quickly and clearly informed of the possibility of refocusing for bringing each of the objects located at different view angle positions on the photographed image into focus based on the metadata when reproducing a recorded image.

Second Embodiment

An image pickup apparatus according to a second embodiment of the present invention is described referring to FIG. 4A and FIG. 4B, FIG. 6, and FIG. 9. In the first embodiment described above, the refocusing processing is not performed for an object determined as unrefocusable. For example, for an object that is present outside the refocusable view angle range 407 and inside the photographing view angle 408 obtained based on the pupil-division pixel area illustrated in FIG. 4A, the refocusing processing is not performed even when a refocusing request is made by the user. On the other hand, in the second embodiment, for a case in which the refocusing request is made by the user for an object that is present outside of the refocusable view angle range, there is described a method of reconstructing the refocused image as high as possible although the object is not brought into full focus.

A configuration of the image pickup apparatus 100 of the second embodiment is the same as that of the image pickup apparatus 100 of the first embodiment described above, illustrated in FIG. 1. This embodiment differs from the first embodiment described above only in Step S607 illustrated in FIG. 6. Therefore, Step S607 is described below. It is assumed that the image photographed by the image pickup apparatus 100 is the same as that illustrated in FIG. 5A. Further, it is assumed that the user selects the object 406 as the main object being a focusing target for refocusing from at least one object.

Figure 9:
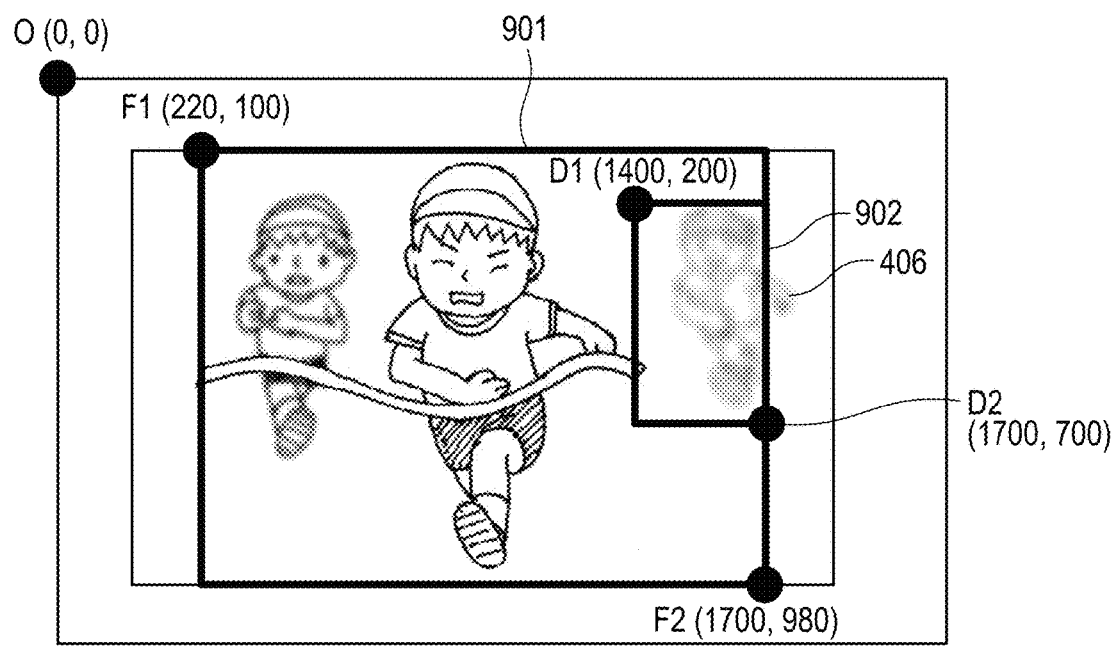
FIG. 9 is a view for illustrating an example where the refocusable view angle range is changed in an image pickup method according to a second embodiment of the present invention.

FIG. 9 is a view for illustrating an example where the refocusable view angle range is changed in an image pickup method according to the second embodiment of the present invention. In Step S607 illustrated in FIG. 6, Expression (5) is not satisfied. Therefore, the refocusing possibility determining unit 110 determines the object 406 as unrefocusable. On the other hand, as illustrated in FIG. 9, the refocusing possibility determining unit 110 changes the refocusable view angle range to a refocusable view angle range 901 so as to include an object area 902 containing the main object 406 selected by the user.

Then, the parameter generating unit 117 obtains coordinates of an upper left corner F1 and coordinates of a lower right corner F2 of the changed refocusable view angle range 901. Further, the parameter generating unit 117 specifies, from the non-volatile memory 112, a transform matrix for reconstructing the same view angle as the refocusable view angle range 901 obtained from the obtained coordinates (specifically a transform matrix having as many pixels within the reduced view angle as columns in which the elements are all zero). A transform matrix M3' that is specified as described above is written in the volatile memory 105 at a position for the object 406 as a new refocusing parameter for the object 406. As a result, when the object 406 is selected as a focusing target for refocusing at the time of reproduction, the refocused image based on the transform matrix M3' is reconstructed.

As described above, in this embodiment, when determining that the refocusing for bringing the main object into focus is impossible, the refocusing possibility determining unit (refocusing possibility determining unit) changes the refocusable view angle range so that the object area for the main object is included therein. Then, the refocusing possibility determining unit determines that the refocusing for bringing the main object into focus is possible. Further, the parameter generating unit (parameter generating unit) generates the parameter for reconstructing the same view angle as the changed refocusable view angle range in association with the main object. Still further, the recording unit (recording medium control unit) records the result of determination made by the refocusing possibility determining unit and the parameter as the metadata of the image together with the image in the recording medium. In this manner, even when a refocusing request is made by the user for the main object that is located outside the refocusable view angle range, the refocused image can be reconstructed at the degree of refocusing as high as possible although the main object is not brought into full focus. The second embodiment can be combined with the first embodiment described above.

Third Embodiment

Figure 10:
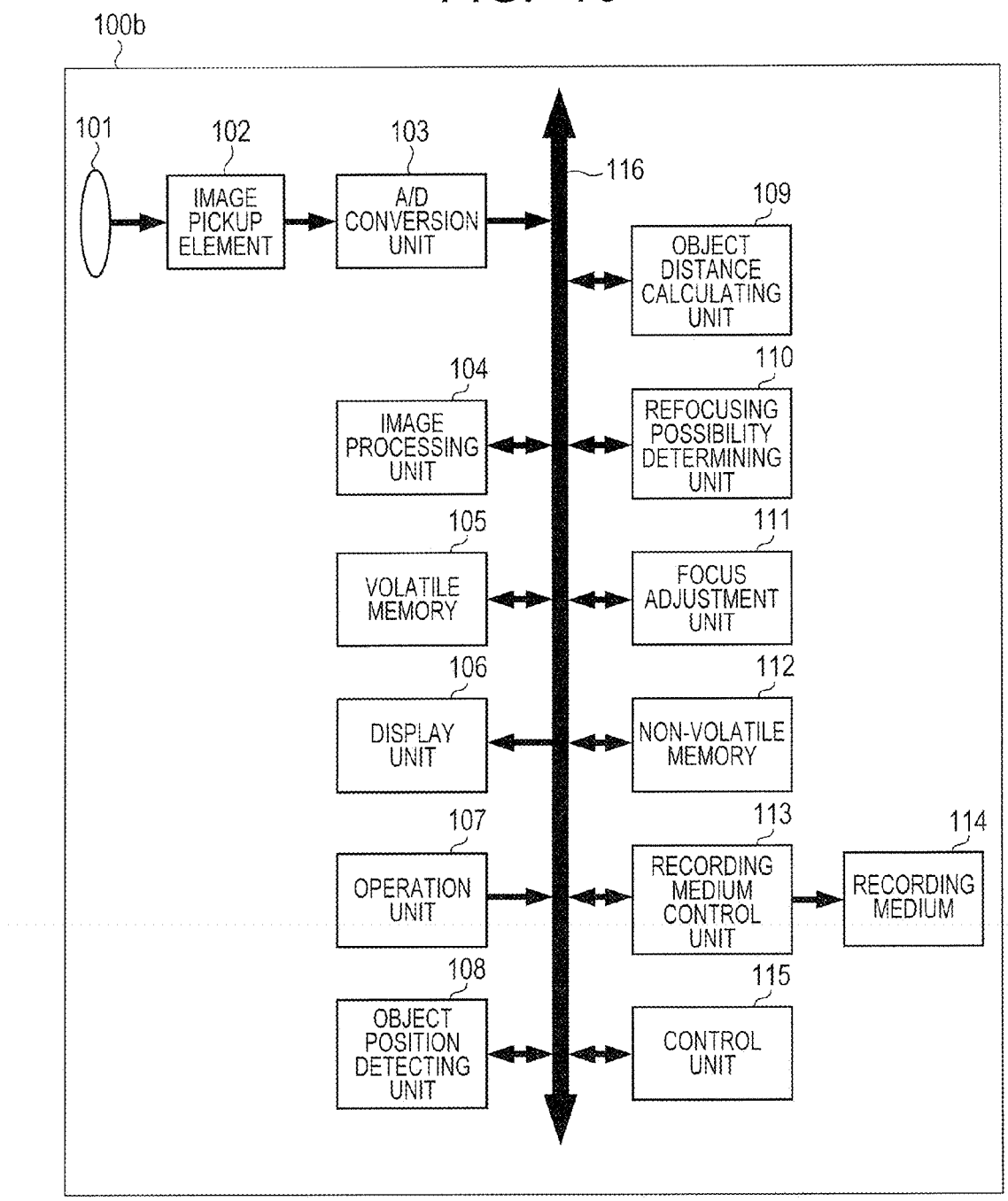
FIG. 10 is a block diagram for illustrating a configuration of an image pickup apparatus according to a third embodiment of the present invention.
Figure 11:
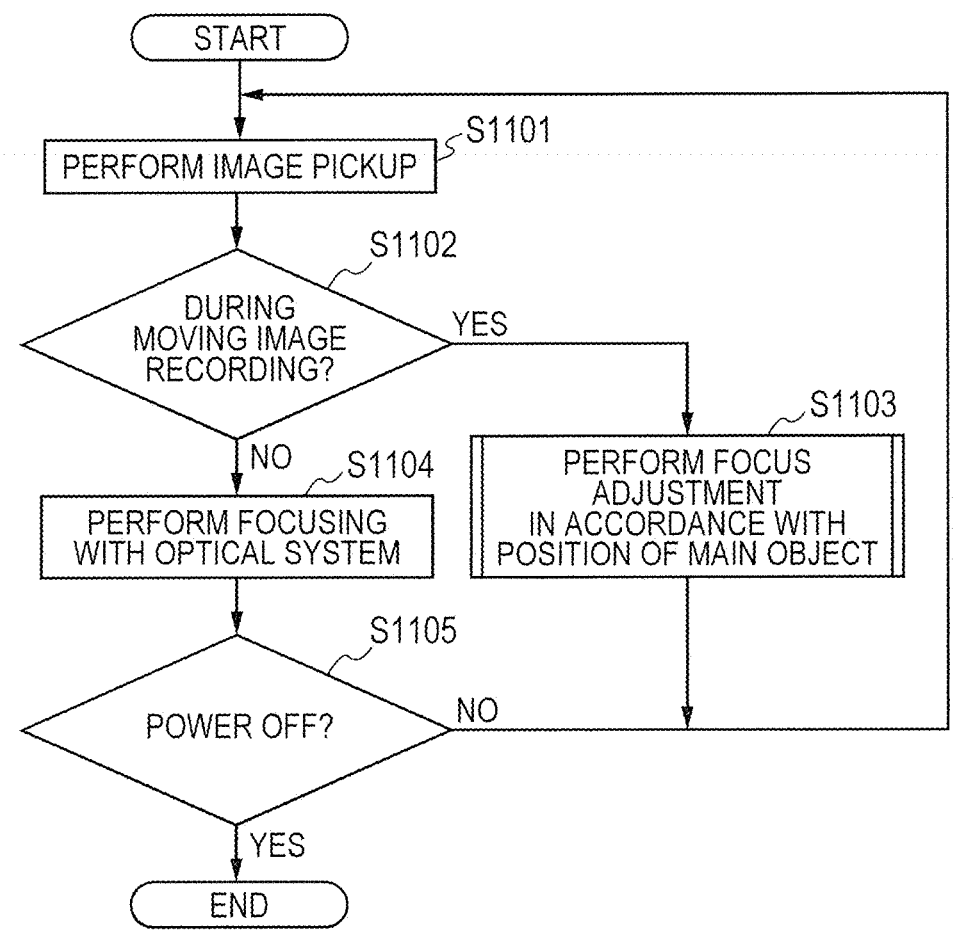
FIG. 11 is a flowchart of an image pickup method according to the third embodiment of the present invention.
Figure 12:
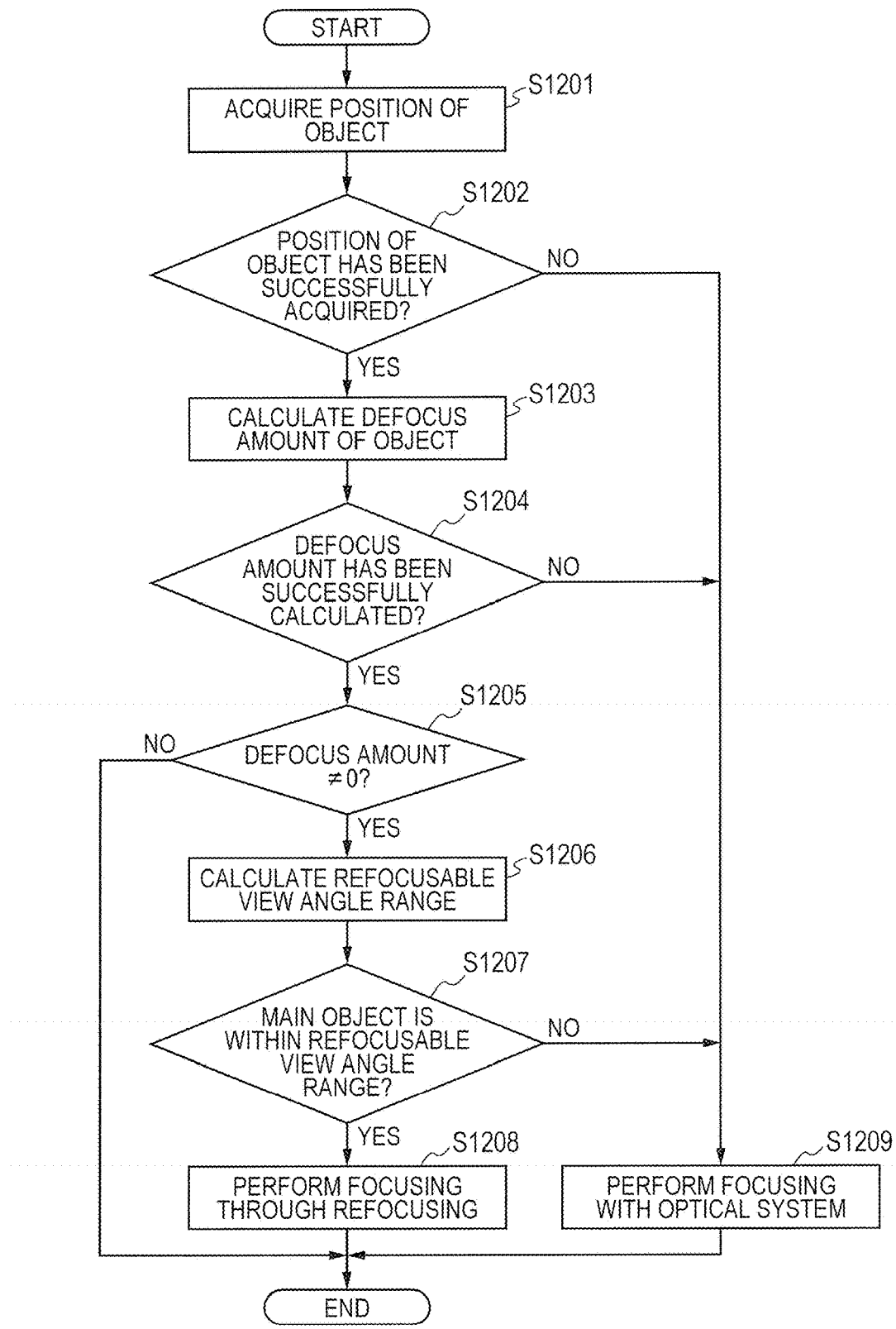
FIG. 12 is a flowchart of a focus adjustment method of bringing a main object in focus in the image pickup method according to the third embodiment of the present invention.

An image pickup apparatus according to a third embodiment of the present invention is described referring to FIG. 10 to FIG. 12. In the third embodiment, there is described a method of switching between a method of driving the focus lens and a method of refocusing the image for the focus adjustment for the main object selected from the objects. FIG. 10 is a block diagram for illustrating a configuration of an image pickup apparatus 100b according to the third embodiment of the present invention. The image pickup apparatus 100b according to the third embodiment, which is illustrated in FIG. 10, differs from the image pickup apparatus 100 according to the first embodiment described above, which is illustrated in FIG. 1, in that a focus adjustment unit 111 is provided in place of the parameter generating unit 117. The remaining configuration is the same as that of the first embodiment described above, and therefore the description thereof is herein omitted.

The focus adjustment unit 111 switches a focus adjustment method for the main object selected from the objects detected by the object position detecting unit 108 in accordance with the result of determination made by the refocusing possibility determining unit 110. Specifically, the focus adjustment unit 111 brings the main object into focus through refocusing when the main object is a refocusable object, and controls the optical system 101 to bring the main object into focus when the main object is an unrefocusable object. Here, as the main object, the largest object of all the objects may be selected or the object located closer to the center of the view angle may be selected. Further, the main object may be arbitrarily selected by the user.

Next, a flow for determining a method of bringing the main object into focus is described referring to FIG. 11. FIG. 11 is a flowchart of an image pickup method according to the third embodiment of the present invention. When the power switch of the operation unit 107 is operated, the image pickup apparatus 100b is activated to start an operation of this flowchart.

In Step S1101, the control unit 115 performs image pickup processing in synchronization with timing of driving the image pickup element 102. The digital image signal obtained by the image pickup processing may be subjected to arbitrary image processing in the image processing unit 104 after being temporarily recorded in the volatile memory 105 or may be transmitted to the image processing unit 104 via the bus 116 so as to be subjected to the arbitrary image processing. The image data processed by the image processing unit 104 is stored in the volatile memory 105.

In Step S1102, the control unit 115 determines whether or not the image pickup apparatus 100b is currently recording a moving image. When the moving image recording has been started by the user through the operation of the operation unit 107, the operation proceeds to Step S1103. On the other hand, when the image pickup apparatus 100b is in a moving image recording standby state or is currently performing still-image live viewing, the operation proceeds to Step S1104. In Step S1103, the object position detecting unit 108, the object distance calculating unit 109, the refocusing possibility determining unit 110, and the focus adjustment unit 111 perform the focus adjustment in accordance with the position of the main object. Then, the operation returns to Step S1101. Details of Step S1103 are described later.

In Step S1104, the control unit 115 controls the optical system 101 to perform focusing processing for the main object. Then, the operation proceeds to Step S1105. Here, the focusing processing is performed by a technique such as the contrast AF. In Step S1105, the control unit 115 determines whether or not the image pickup apparatus 100b is powered ON. When the image pickup apparatus 100b is powered ON, the operation returns to Step S1101. On the other hand, when the image pickup apparatus 100b is not powered ON, the operation in the flow is terminated.

Next, a detailed flow in Step S1103 illustrated in FIG. 11 is described referring to FIG. 12. FIG. 12 is a flowchart of a focus adjustment method for the main object in the image pickup method according to the third embodiment of the present invention. In Step S1201, the object position detecting unit 108 inputs the image data stored in the volatile memory 105 to acquire the positional information of the object (object area).

In Step S1202, the object position detecting unit 108 determines whether or not the positional information of the object has been successfully acquired. When the positional information of the object has been successfully acquired, the operation proceeds to Step S1203. When the positional information of the object has not been successfully acquired, the operation proceeds to Step S1209. In Step S1203, the object distance calculating unit 109 selects any one of all the detected objects as the main object, and calculates a defocus amount of the main object. Here, the largest object of all the objects may be selected as the main object, or the object located in the center of the view angle may be selected as the main object. Alternatively, the object arbitrarily selected by the user may be selected as the main object.

In Step S1204, the object distance calculating unit 109 determines whether or not the defocus amount of the main object has been successfully calculated. When the defocus amount of the main object has been successfully calculated, the operation proceeds to Step S1205. On the other hand, when the defocus amount of the main object has not been successfully calculated, the operation proceeds to Step S1209. In Step S1205, the object distance calculating unit 109 determines whether or not the calculated defocus amount of the main object is zero. When the defocus amount of the main object is not zero, the operation proceeds to Step S1206. On the other hand, when the defocus amount is zero, the main object has already been brought into focus. Therefore, the operation of the flow is terminated.

In Step S1206, the object distance calculating unit 109 calculates a distance from the image pickup apparatus 100b to the main object from the defocus amount of the main object. Further, the refocusing possibility determining unit 110 adjusts a reference position of the digital image signal for each of the pupil-division regions so that the defocus amount of the main object, which is calculated in Step S1203, becomes zero. Then, by adjusting the reference positions, coordinates within the photographing view angle range in which the refocused image can be generated are calculated. Here, the refocusing cannot be performed for a pixel without a pupil-division region, and therefore, such a pixel is not included in the refocusable view angle range.

In Step S1207, the refocusing possibility determining unit 110 determines whether or not the object area of the main object, which is acquired in Step S1201, falls within the refocusable view angle range calculated in Step S1206. When the object area falls within the refocusable view angle range, the main object is determined as refocusable. When the object area is outside of the refocusable view angle range, the main object is determined as an unrefocusable object. When the main object is the refocusable object, the focus adjustment unit 111 determines that the main object is to be brought into focus through refocusing. Then, control is performed so that the operation proceeds to Step S1208. On the other hand, when the main object is the unrefocusable object, it is determined that the focusing is performed through control of the optical system 101. Then, control is performed so that the operation proceeds to Step S1209.

In Step S1208, the image processing unit 104 generates the refocused image including the main object being in focus in response to an instruction to perform the focusing processing through refocusing from the control unit 115, and records the thus generated refocused image in the volatile memory 105. In Step S1209, the control unit 115 controls the optical system 101 to perform the focusing processing for the main object. Here, it is assumed that the focusing processing is performed by a technique such as the contrast AF.

Although the object has been described as a person, the kind of object is not limited thereto. Further, the refocusable view angle range is calculated giving priority to the defocus amount of the main object over the position of the main object within the photographing view angle. Therefore, the main object can be kept in focus through refocusing when the main object is often located in the center of the screen. On the other hand, when the refocusable view angle range is calculated giving priority to the position of the main object within the photographing view angle over the defocus amount of the main object, the main object can be kept in focus through refocusing when the main object frequently moves within the screen. Further, the focusing is performed through the control of the optical system 101 when the image pickup apparatus is in the moving image recording standby state or is currently performing the still-image live viewing, whereas the focus adjustment method is selected in accordance with the position of the main object within the view angle only during the recording of the moving image. However, the selection of the focus adjustment method may also be performed in the moving image recording standby state or during the still-image live viewing.

As described above, in the third embodiment, the image pickup apparatus includes the focus adjustment unit (focus adjustment unit) configured to determine whether to refocus the image or to drive the focus lens based on the result of determination made by the refocusing possibility determining unit. As a result, even when the main object is brought into focus by switching the method of refocusing the image and the method of driving the focus lens, the possibility of refocusing for bringing the main object into focus can be more appropriately determined based on the refocusable view angle range. Further, the third embodiment can be combined with the first embodiment and the second embodiment described above.

Fourth Embodiment

An image pickup apparatus according to a fourth embodiment of the present invention is described referring to FIG. 13 to FIG. 15D. In a related-art image pickup apparatus configured to drive the focus lens to focus on the main object, there is a possibility that the result of determination of the possibility of refocusing for bringing the object into focus may be different when the distance to the main object and the position of the main object within the photographing view angle change as a result of the drive of the focus lens. As a result, when the refocusing is desired to be performed after photographing so as to bring an object other than the main object into focus, it is sometimes found that the refocusing for bringing the object into focus is impossible in practice, which is inconvenient for the user. Therefore, in this embodiment, there is described a method of determining the possibility of refocusing for bringing each of the objects located at different view angle positions on the photographed image into focus so as to clearly inform the user of the result of determination when the main object is brought into focus even in a case where the refocusable view angle range is changed.

Figure 13:
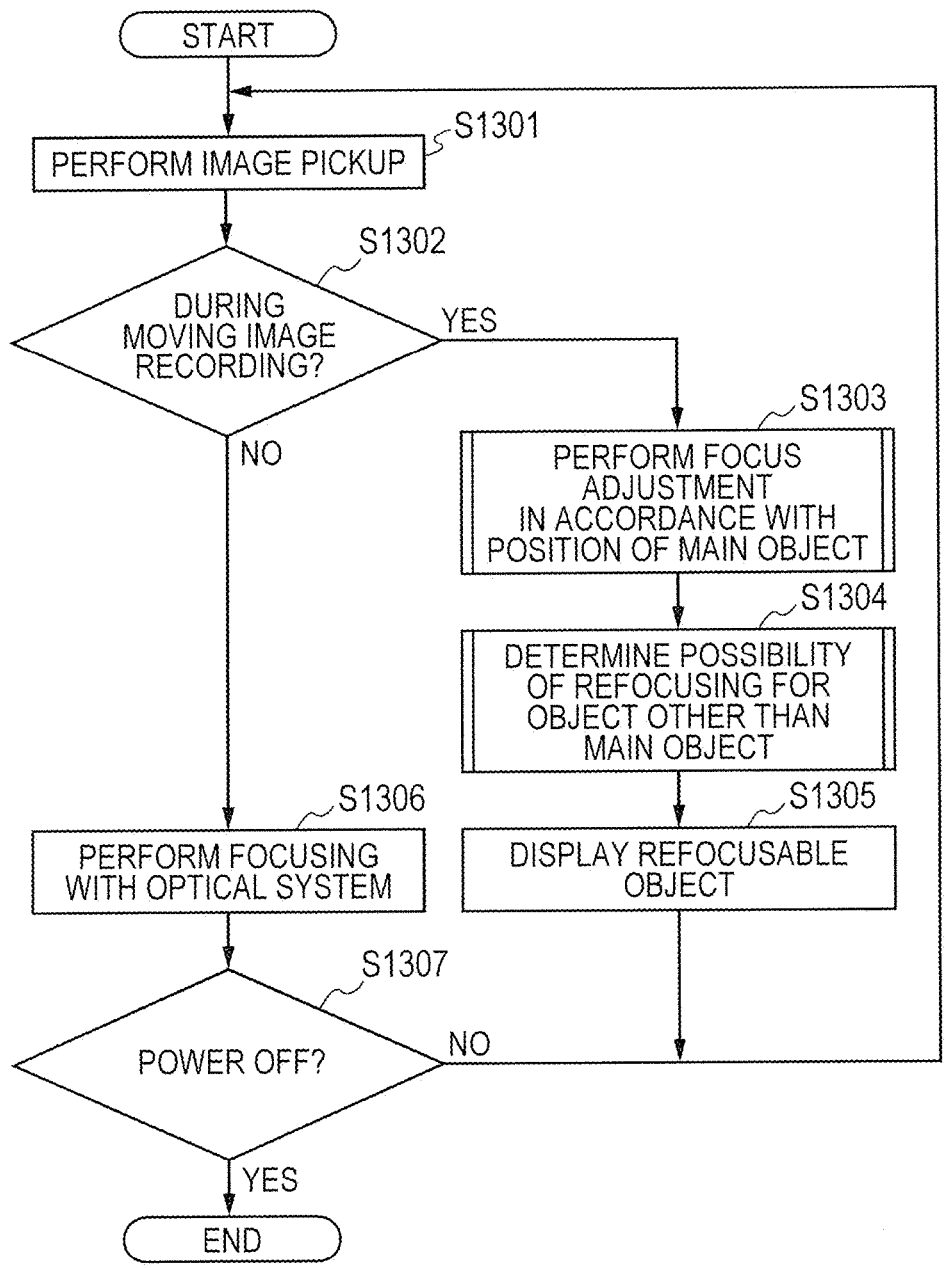
FIG. 13 is a flowchart of an image pickup method according to a fourth embodiment of the present invention.

FIG. 13 is a flowchart of an image pickup method according to the fourth embodiment of the present invention. The flowchart of FIG. 13 according to this embodiment differs from the flowchart of FIG. 11 according to the third embodiment described above, in that Steps S1304 and S1305 are added. An operation in the other steps is the same as that in the third embodiment described above, and therefore the description thereof is herein omitted.

In Step S1304, the refocusing possibility determining unit 110 determines whether or not the refocusing for bringing the object other than the main object into focus is possible. Details of Step S1304 are described later. In Step S1305, the control unit 115 displays the image within the photographed view angle range on the display unit 106 with a frame superimposed on the object that is determined as refocusable by the refocusing possibility determining unit 110.

Next, a detailed flow of Step S1304 of FIG. 13, in which whether or not the refocusing for bringing the object other than the main object into focus is possible is determined, is described referring to FIG. 14. FIG. 14 is a flowchart of a refocusing possibility determining method in the image pickup method according to the fourth embodiment of the present invention. In Step S1401, the object position detecting unit 108 determines whether or not the positional information of the object other than the main object has been successfully acquired from the objects detected at the time of focus adjustment for the main object in Step S1303. When there is any object for which the positional information has been successfully acquired, the operation proceeds to Step S1402. On the other hand, when there is no object for which the positional information has been successfully acquired, the flow is terminated.

In Step S1402, the object distance calculating unit 109 calculates the defocus amount of the object for which the possibility of refocusing is not determined by the refocusing possibility determining unit 110, among all the objects from which the positional information has been successfully acquired in Step S1401. In Step S1403, the refocusing possibility determining unit 110 calculates the refocusing possibility view angle range at the position of the object from the defocus amount of the object, which is calculated in Step S1402.

In Step S1404, the refocusing possibility determining unit 110 determines whether or not the object is a refocusable object. The object for which the defocus amount cannot be successfully calculated in Step S1402 is determined as an unrefocusable object. Further, when the defocus amount calculated in Step S1402 is zero, the object has already been brought into focus. Therefore, the object is determined as a refocusable object. Further, when the object is located within the refocusable view angle range calculated in Step S1403, the object is determined as a refocusable object. On the other hand, when the object is located outside of the refocusable view angle range, the object is determined as an unrefocusable object.

Here, when the object area detected by the object position detecting unit 108 is entirely included in the refocusable view angle range, the object may be determined as refocusable. Alternatively, when the face area of the object is entirely included in the refocusable view angle range, the object may be determined as refocusable. Further, when a percentage or a region of the object area, which is specified in advance by the user, is included in the refocusable view angle range, the object may be determined as refocusable.

In Step S1405, the refocusing possibility determining unit 110 determines whether the determination of possibility of refocusing has been completed for all the objects from which the positional information has been acquired by the object position detecting unit 108. When the determination has not been completed for all the objects, the operation returns to Step S1402. On the other hand, when the determination has been completed for all the objects, the flow is terminated. Here, when the frame is superimposed on the object determined as refocusable in Step S1305 of FIG. 13, the main object may be included in the refocusable object.

Figure 15A:
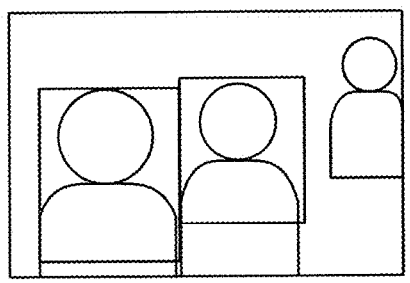
FIGS. 15A, 15B, 15C and 15D are views for illustrating an example of display for a refocusable object in the image pickup method according to the fourth embodiment of the present invention.
Figure 15B:
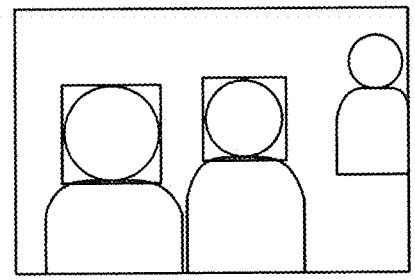
Figure 15C:
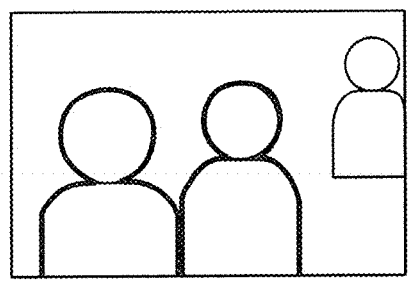
Figure 15D:
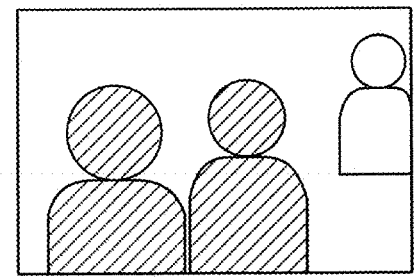

FIG. 15A to FIG. 15D are views for illustrating a display example of a refocusable object in the image pickup method according to the fourth embodiment of the present invention. When the user is clearly informed of the refocusable objects, the frame may be superimposed on an upper body of each of the objects as illustrated in FIG. 15A, or the frame may be superimposed on the face area of each of the objects as illustrated in FIG. 15B. Further, edge extraction may be performed on the object by the image processing unit 104 so that a profile of the object may be thickened to be emphasized as illustrated in FIG. 15C or a texture such as diagonal lines or a simple color may be superimposed on the object area as illustrated in FIG. 15D. Then, the refocusable distance range for the object may be expressed by a color of the frame, or a numeric character, a character, or a symbol may be superimposed on the frame in display. Further, the above-mentioned display methods may be used in combination. Further, the display method is not limited to those described above as long as a notification of the refocusable object can be made.

Further, the method of displaying the refocusable object at the time of photographing is described. However, the above-mentioned display method can also be applied to display in the following case. Specifically, the RAW data is losslessly compressed for each of the pupil-division regions. Refocusable object information is stored in association with the losslessly compressed RAW data. Thereafter, the refocusing processing is performed. In this manner, as a result of the focusing on the main object, the user can be notified of the object other than the main object, which can be brought into focus through refocusing. Here, the focusing is performed by the control of the optical system 101 in the moving image recording standby state or during the still-image live viewing, whereas the focus adjustment method is selected in accordance with the position of the main object within the view angle only during the moving image recording. However, the above-mentioned selection of the focus adjustment method may be applied in the moving image recording standby state or during the still-image live viewing.

As described above, in this embodiment, the image pickup apparatus includes the display unit (display unit) configured to display the possibility of refocusing for bringing the object into focus together with the image based on the result of determination made by the refocusing possibility determining unit. In this manner, when the main object is brought into focus, the possibility of refocusing can be determined for each of the objects other than the main object, which are located at different view angle positions on the photographed image so that the user can be clearly informed of the possibility of refocusing even in a case where the refocusable view angle range changes. Further, the fourth embodiment can be combined with the first to third embodiments described above.

Fifth Embodiment

Figure 16:
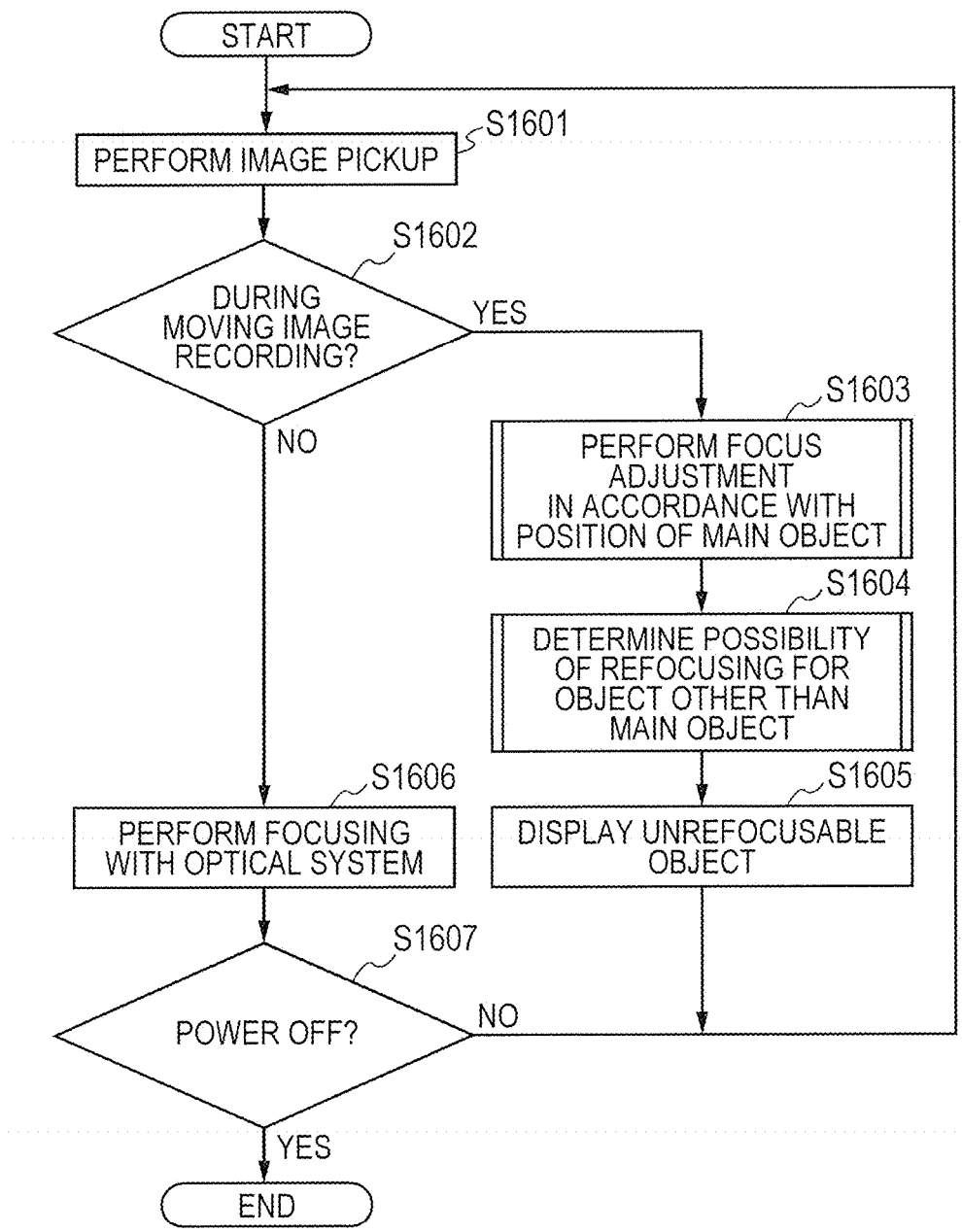
FIG. 16 is a flowchart of an image pickup method according to a fifth embodiment of the present invention.
Figure 17A:
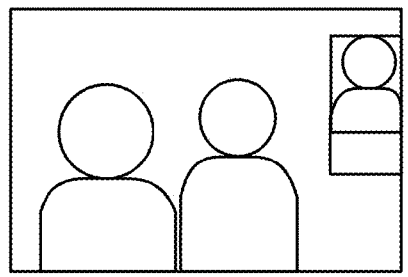
FIGS. 17A, 17B, 17C and 17D are views for illustrating an example of display for an unrefocusable object in the image pickup method according to the fifth embodiment of the present invention.
Figure 17B:
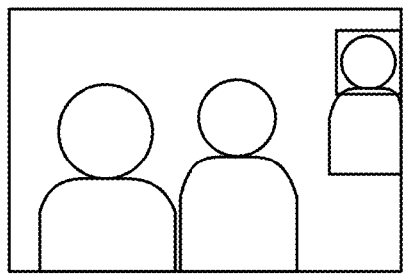
Figure 17C:
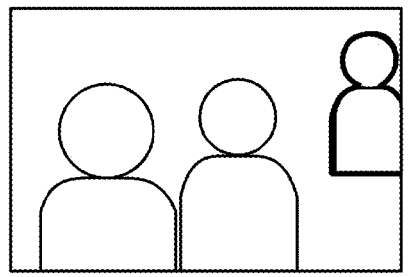
Figure 17D:
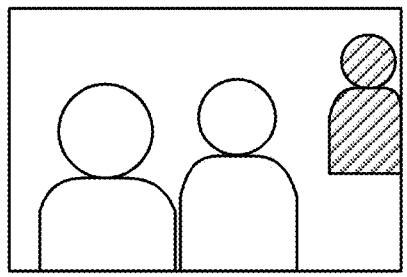

An image pickup apparatus according to a fifth embodiment of the present invention is described referring to FIG. 16 to FIG. 17D. The method of displaying the refocusable object is described in the fourth embodiment described above, whereas a method of displaying the unrefocusable object is described in the fifth embodiment.

FIG. 16 is a flowchart of an image pickup method according to the fifth embodiment of the present invention. The flowchart of FIG. 16 according to the fifth embodiment differs from the flowchart of FIG. 13 according to the fourth embodiment described above only in processing performed in Step S1305 (step S1605). An operation in the other steps is the same as that of the fourth embodiment described above, and therefore the description thereof is herein omitted.

In Step S1604, the refocusing possibility determining unit 110 determines the possibility of refocusing for bringing the object other than the main object into focus. Here, a detailed flow in Step S1604 is the same as that in FIG. 14, and a detailed description thereof is omitted. In Step S1605, the control unit 115 displays, on the display unit 106, the image within the photographing view angle with a frame superimposed on the object determined as unrefocusable by the refocusing possibility determining unit 110.

FIG. 17A to FIG. 17D are views for illustrating examples of display for the unrefocusable object in the image pickup method according to the fifth embodiment of the present invention. When the user is to be clearly informed of the unrefocusable object, a frame may be superimposed on the upper body of the object as illustrated in FIG. 17A, or the frame may be superimposed on the face area of the object as illustrated in FIG. 17B. Alternatively, the edge extraction may be performed on the object by the image processing unit 104 so that the profile of the object is thickened to be emphasized as illustrated in FIG. 17C or the texture such as the diagonal lines or the simple color is superimposed on the object area as illustrated in FIG. 17D. Further, the refocusable distance range for the object may be expressed by a color of the frame, or a numeric character, a character, or a symbol may be displayed on the frame in a superimposed manner. Still further, the above-mentioned display methods may be used in combination. The display method is not limited to those described above as long as a notification of the unrefocusable object can be made.

Further, although the method of displaying the unrefocusable object at the time of photographing is described in this embodiment, the display method can also be applied to display in the following case. Specifically, the RAW data is losslessly compressed for each of the pupil-division regions. Unrefocusable object information is stored in association with the losslessly compressed RAW data. Subsequently, the refocusing processing is performed.

In this manner, as a result of the focusing on the main object, the user can be notified of the object other than the main object, which cannot be brought into focus through refocusing. Here, the focusing is performed by the control of the optical system 101 in the moving image recording standby state or during the still-image live viewing, whereas the focus adjustment method is selected in accordance with the position of the main object within the view angle only during the moving image recording. However, the above-mentioned selection of the focus adjustment method may be applied in the moving image recording standby state or during the still-image live viewing. As described above, even in this embodiment, the same effects as those of the fourth embodiment described above can be obtained. Further, the fifth embodiment can be combined with the first to fourth embodiments described above.

Sixth Embodiment

Figure 18:
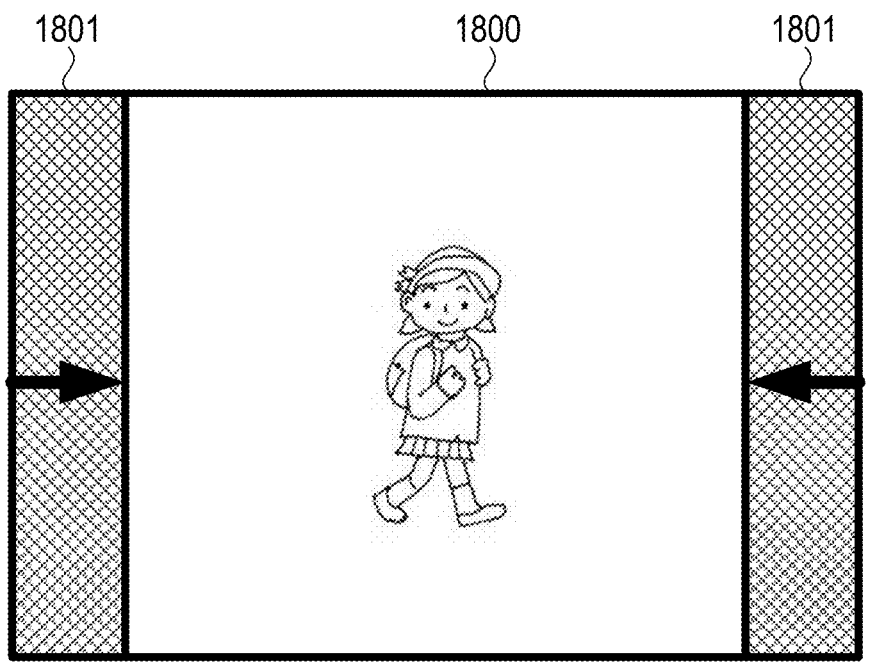
FIG. 18 is a view for illustrating the refocusable view angle range in an image pickup apparatus according to a sixth embodiment of the present invention.
Figure 19:
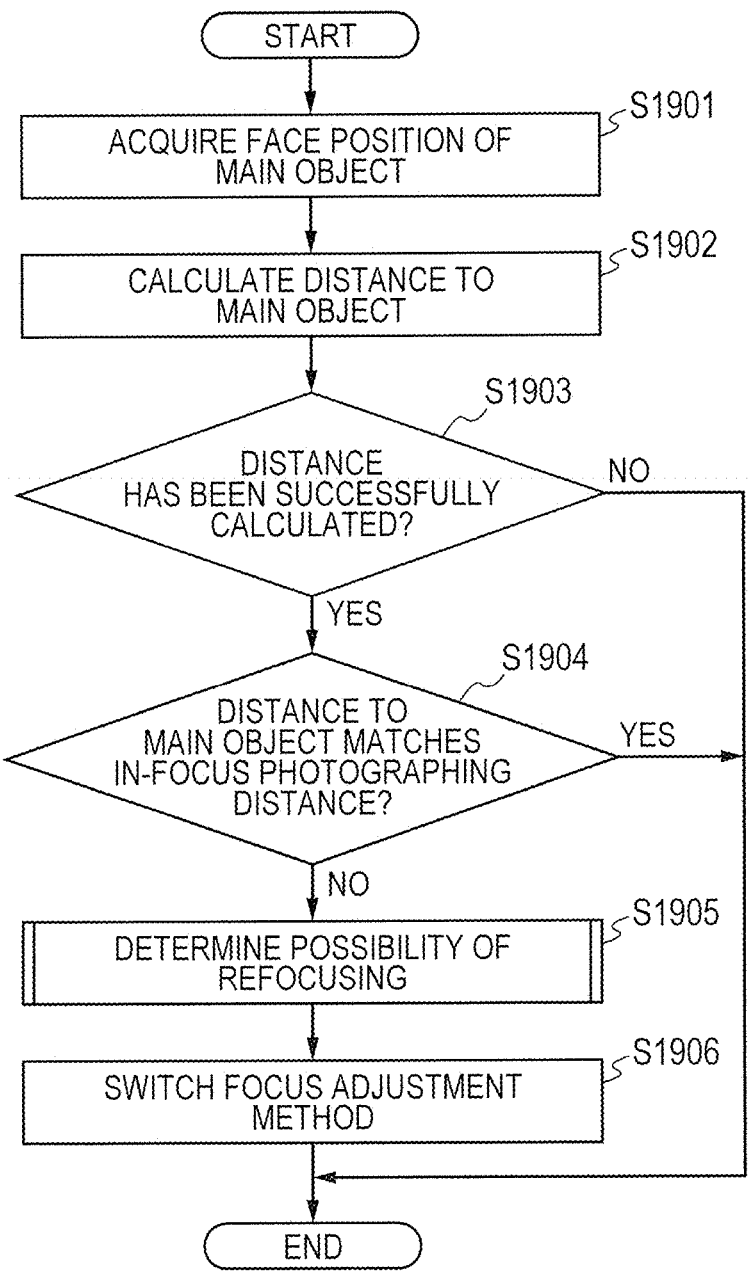
FIG. 19 is a flowchart of an image pickup method according to the sixth embodiment of the present invention.
Figure 20:
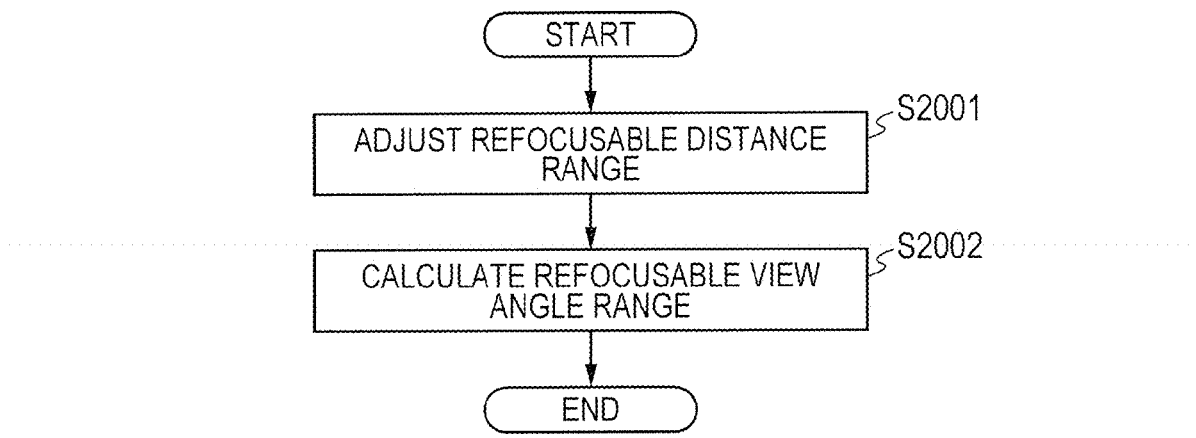
FIG. 20 is a flowchart of a method of determining possibility of refocusing, giving priority to the refocusable distance range in the image pickup method according to the sixth embodiment of the present invention.

An image pickup apparatus according to a sixth embodiment of the present invention is described referring to FIG. 18 to FIG. 20. As described above, the refocusable distance range and the refocusable view angle range have a trade-off relationship. Therefore, in this embodiment, a method of determining the possibility of refocusing, giving priority to the refocusable distance range over the refocusable view angle range, is first described.

FIG. 18 is a view for illustrating the refocusable view angle range in the image pickup apparatus according to the sixth embodiment of the present invention. In FIG. 18, a refocusable view angle range 1800 and a range 1801 outside of the refocusable view angle range are illustrated. A configuration of the image pickup apparatus according to this embodiment is the same as that of the image pickup apparatus 100b illustrated in FIG. 10 according to the fourth embodiment described above. As illustrated in FIG. 18, when the refocusable distance range is increased, the refocusable view angle range 1800 is horizontally reduced from ends of a screen toward a center. A central position and a direction of change of the refocusable view angle range 1800 differ depending on the arrangement and a direction of division of the pupil-division regions. Further, when an incident angle of incident light changes depending on the F value, a rate of increase or decrease of the refocusable view angle range 1800 changes with respect to the refocusable distance range.

FIG. 19 is a flowchart of an image pickup method according to the sixth embodiment of the present invention. First, an outline of the flowchart of FIG. 19 is described. FIG. 19 is a flowchart in which the focus adjustment method is switched in accordance with the refocusable range for the main object, which is detected during image photographing. When the main object is not detected, the focus adjustment is performed only by using the optical system 101 without switching the focus adjustment method.

The focus adjustment unit 111 regards a moving image as a set of continuous frame images, and determines whether to refocus the frame images or to drive the focus lens based on the result of determination made by the refocusing possibility determining unit 110. Specifically, when the refocusing for bringing the object into focus is possible, the refocusing is performed. On the other hand, when the refocusing for bringing the object into focus is impossible, the optical system 101 is controlled to perform the focus adjustment. Then, when it is determined that the focus adjustment method is not required to be switched, the flow is terminated. The flowchart of FIG. 19 is described for each of the steps below.

In Step S1901, the control unit 115 acquires positions of faces of the objects recorded in the volatile memory 105.

Then, the object having the largest face size of all the detected objects is selected as the main object. Alternatively, the object selected by the user through touch on the display unit 106 may be selected as the main object. When the detection of the main object becomes impossible, the object having the largest face size of all the detected objects is reselected as the main object. Then, a central position of the face and a size of the face of the main object are set as the object information (object area).

In Step S1902, the object distance calculating unit 109 calculates a phase difference for each of the pupil-division regions of the image recorded in the volatile memory 105, based on the object position information, and converts the calculated phase difference into the defocus amount from an in-focus photographing distance position. Then, the in-focus photographing distance position and the defocus amount are added to calculate the object distance information of the main object.

In Step S1903, the control unit 115 determines whether or not the object distance information has been successfully calculated in Step S1902. When the object distance information has been successfully calculated, the operation proceeds to Step S1904. On the other hand, when the object distance information has not been successfully calculated, the flow is terminated.

In Step S1904, the control unit 115 determines whether or not the object distance information calculated in Step S1902 matches the in-focus photographing distance. When the object distance information matches the in-focus photographing distance, the focus adjustment is not required to be performed. Therefore, the flow is terminated. On the other hand, when the object distance information does not match the in-focus photographing distance, the operation proceeds to Step S1905. In Step S1905, the refocusing possibility determining unit 110 calculates the refocusable distance range of the main object and the refocusable view angle range from the object position information, the object distance information, the in-focus photographing distance, and the F value. Then, the possibility of refocusing is determined. Details of the refocusing possibility determining method are described later referring to FIG. 20 and FIG. 22.

In Step S1906, the focus adjustment unit 111 switches the focus adjustment method in accordance with the result of determination made in Step S1905. For example, it is determined to perform the refocusing when the refocusing is possible, whereas it is determined to perform the focus adjustment through the control of the optical system 101 when the refocusing is impossible. Although the main object is limited to a person in this flowchart, an object detecting unit may be provided so that an object or an animal can be the main object.

Figure 21:
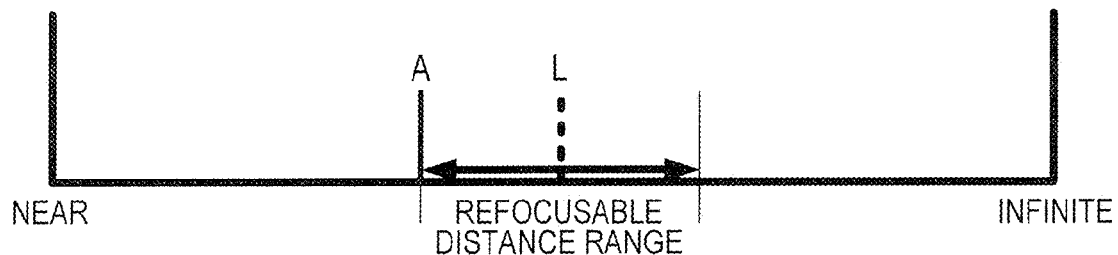
FIG. 21 is a diagram for illustrating the refocusable distance range in the image pickup method according to the sixth embodiment of the present invention.

Now, the refocusing possibility determining method carried out in Step S1905 of FIG. 19 is described referring to FIG. 20 and FIG. 21. FIG. 20 is a flowchart of the method of determining the possibility of refocusing, giving priority to the refocusable distance range, in the image pickup method according to the sixth embodiment of the present invention. FIG. 21 is a flowchart for illustrating the refocusable distance range in the image pickup method according to the sixth embodiment of the present invention.

In Step S2001, the refocusing possibility determining unit 110 adjusts the refocusable distance range so that the main object falls within the refocusable distance range. Specifically, as illustrated in FIG. 21, the refocusable distance range is adjusted so that a main object A is located at an end of the refocusable distance range indicated by the arrow. The adjusted range is the result of calculation of the refocusable distance range. Here, an in-focus photographing distance L illustrated in FIG. 21 indicates a distance at which the object is in focus at a position of the focus lens. The arrow indicates the refocusable distance range before the adjustment at the position of the focus lens. In Step S2002, the refocusing possibility determining unit 110 calculates the refocusable view angle range based on the refocusable distance range. As a result, as illustrated in FIG. 18, the refocusable view angle range that is reduced along with the enlargement of the refocusable distance range is the result of calculation.

As described above, in this embodiment, the refocusing possibility determining unit (refocusing possibility determining unit) adjusts the refocusable distance range so that the object distance of the main object is included in the refocusable distance range. Then, through comparison between the refocusable view angle range calculated from the adjusted refocusable distance range and the object area of the main object, the possibility of refocusing for bringing the main object into focus is determined. As a result, the refocusing possibility determining unit calculates the refocusable range, giving priority to a change in distance of the main object over a change in position of the main object within the photographing view angle. Thus, for example, when the main object is frequently located in the center of the screen, the refocusing can be continuously performed without driving the focus lens. The sixth embodiment can be combined with the first to fifth embodiments described above.

Seventh Embodiment

Figure 22:
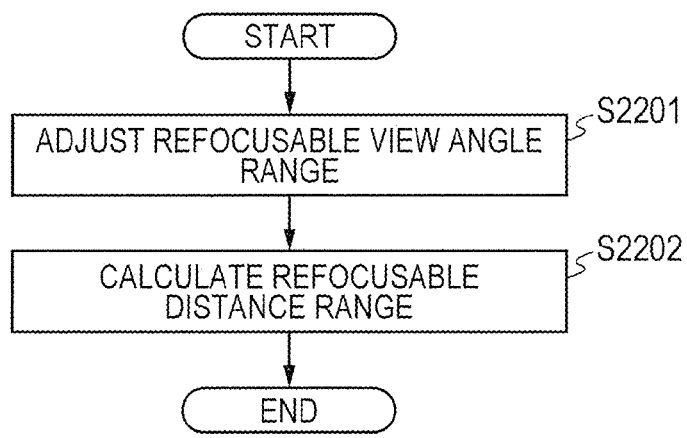
FIG. 22 is a flowchart of a method of determining possibility of refocusing, giving priority to the refocusable view angle range in an image pickup method according to a seventh embodiment of the present invention.
Figure 23:
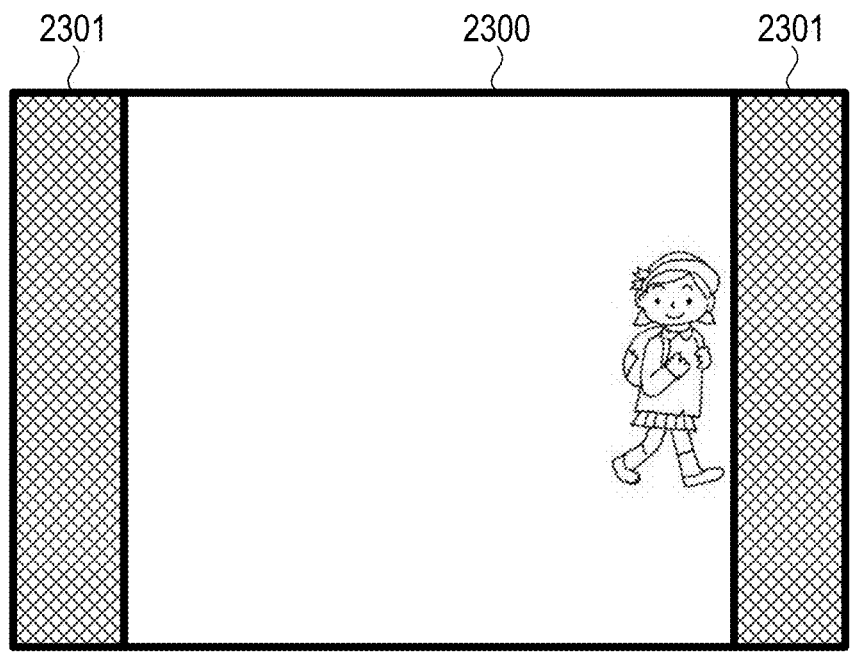
FIG. 23 is a view for illustrating a calculation of the refocusable view angle range in the image pickup method according to the seventh embodiment of the present invention.

An image pickup apparatus according to a seventh embodiment of the present invention is described referring to FIG. 22 and FIG. 23. In the sixth embodiment described above, the method of determining the possibility of refocusing, giving priority to the refocusable distance range over the refocusable view angle range, is described. On the other hand, in the seventh embodiment, a method of determining the possibility of refocusing, giving priority to the refocusable view angle range over the refocusable distance range, is described.

The refocusing possibility determining method of this embodiment, which is carried out in Step S1905 of FIG. 19 according to the sixth embodiment described above, is described referring to FIG. 22 and FIG. 23. FIG. 22 is a flowchart of the method of determining the possibility of refocusing, giving priority to the refocusable view angle range, in an image pickup method according to the seventh embodiment of the present invention. FIG. 23 is a view for illustrating the calculation of the refocusable view angle range in the image pickup method according to the seventh embodiment of the present invention. The refocusable range is calculated, giving priority to the change in distance of the main object, in the sixth embodiment described above, whereas the refocusable range is calculated, giving priority to the change in position of the main object within the photographing view angle, in this embodiment.

A flowchart of the focus adjustment in this embodiment is the same as that of the sixth embodiment described above referring to FIG. 19. Therefore, the description thereof is herein omitted. In this flowchart, the description is also omitted for the same processing as that in the sixth embodiment described above.

In Step S2201, the refocusing possibility determining unit 110 calculates the refocusable view angle range so that the object area of the main object falls within the refocusable view angle range. Specifically, as illustrated in FIG. 23, the refocusable view angle range is adjusted so that the main object is located inside ends of the refocusable view angle range indicated as a region 2300. The thus adjusted region 2300 is the result of calculation of the refocusable view angle range. Further, a region 2301 is outside of the refocusable view angle range. In Step S2202, the refocusing possibility determining unit 110 calculates the refocusable distance range based on the refocusable view angle range. As a result, as illustrated in FIG. 23, the refocusable distance range that is reduced along with the enlargement of the refocusable view angle range is the result of calculation.

As described above, in this embodiment, the refocusing possibility determining unit (refocusing possibility determining unit) adjusts the refocusable view angle range so that the object area of the main object is included in the refocusable view angle range. Then, through comparison between the refocusable distance range calculated from the adjusted refocusable view angle range and the object distance of the main object, the possibility of refocusing for bringing the main object into focus is determined. As a result, the refocusing possibility determining unit calculates the refocusable range, giving priority to the change in position of the main object within the photographing view angle over the change in distance of the main object. Therefore, for example, when the main object passes across the screen, the refocusing can be continuously performed without driving the focus lens. The seventh embodiment can be combined with the first to sixth embodiments described above.

Eighth Embodiment

Figure 24:
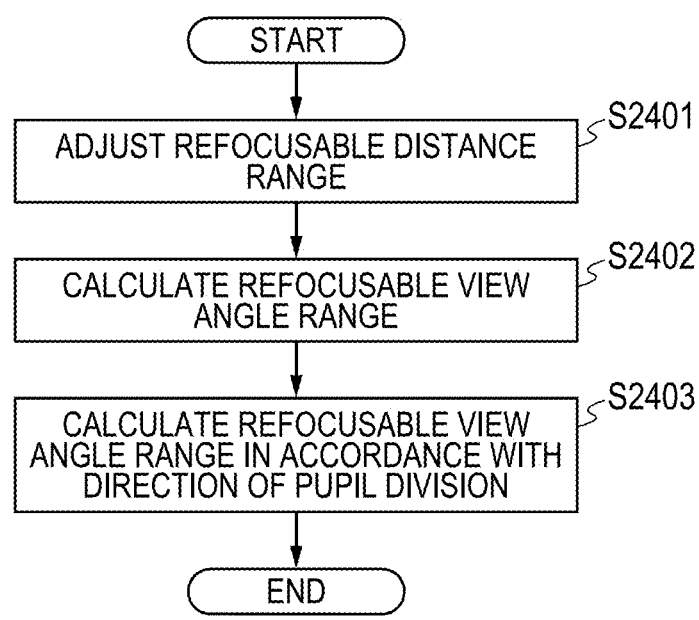
FIG. 24 is a flowchart of a method of calculating the refocusable view angle range in accordance with a direction of pupil division in an image pickup method according to an eighth embodiment of the present invention.

An image pickup apparatus according to an eighth embodiment of the present invention is described referring to FIG. 24. In the first to seventh embodiments described above, it is assumed that the pupil-division regions of the image pickup element 102 are obtained by horizontal division. On the other hand, in the eighth embodiment, a case where the pupil-division regions of the image pickup element 102 are obtained by division in a direction other than the horizontal direction is described.

The refocusing possibility determining method of this embodiment, which is carried out in Step S1905 of FIG. 19 according to the sixth embodiment described above, is described referring to FIG. 24. FIG. 24 is a flowchart of a method of calculating the refocusable view angle range in accordance with the direction of pupil division in an image pickup method according to the eighth embodiment of the present invention. In this embodiment, the refocusable view angle range is calculated in consideration of the direction of the pupil division of the image pickup element 102.

A flowchart of the focus adjustment in this embodiment is the same as that of the sixth embodiment described above referring to FIG. 19. Therefore, the description thereof is herein omitted. The description is also omitted for the same processing in this flowchart as that of the sixth embodiment described above. In Step S2401, the refocusing possibility determining unit 110 calculates the refocusable distance range as in the sixth embodiment described above. In Step S2402, the refocusing possibility determining unit 110 calculates the refocusable view angle range, as in the sixth embodiment described above.

In Step S2403, the refocusing possibility determining unit 110 changes the refocusable view angle range in accordance with the direction of the pupil division and the position of the main object within the photographing view angle for the refocusable view angle range calculated in Step S2402. In FIG. 18 referred to in the sixth embodiment described above, it is assumed that the direction of the pupil division of the image pickup element 102 is the traverse direction. Therefore, the refocusable view angle range is reduced in the traverse direction. On the other hand, for example, when the direction of the pupil division of the image pickup element 102 is a longitudinal direction in this embodiment, the refocusable view angle range is reduced in the longitudinal direction from the ends of the screen toward the center in accordance with the distance of the main object.

In particular, when there are a plurality of pupil-division directions, the refocusable view angle range can be changed in accordance with the position of the main object within the photographing view angle. For example, when the main object is located at the right or left end, the refocusable view angle range is calculated for the pupil division in the longitudinal direction. On the other hand, when the main object is located at an upper or lower end, the refocusable view angle range is calculated for the pupil division in the traverse direction.

As described above, in this embodiment, the refocusing possibility determining unit (refocusing possibility determining unit) calculates the refocusable view angle range in accordance with the direction of the pupil division of the image pickup element in the pupil-division pixel area. As a result, the refocusing can be continuously performed in accordance with the position of the main object and the direction of the pupil division of the image pickup apparatus. The eighth embodiment can be combined with the first to seventh embodiments described above.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-152454, filed Jul. 31, 2015, which is hereby incorporated by reference herein in its entirety.

What is claimed is:

1. An image pickup apparatus configured to reconstruct a refocused image, the image pickup apparatus comprising:
   one or more processors; and
   a memory storing instructions which, when the instructions are executed by the one or more processors, cause the image pickup apparatus to function as units comprising:
   (1) an acquisition unit configured to acquire an image photographed by using an image pickup element having a pupil-division pixel area together with photographing information of an optical system at a time of photographing, the photographing information including an F-number;
   (2) an object detecting unit configured to detect at least one object on the image so as to calculate an object area of the at least one object and calculate an object distance corresponding to a depth distance to the at least one object from a defocus amount in the object area; and
   (3) a refocusing possibility determining unit configured to determine possibility of refocusing for bringing the at least one object into focus by calculating a refocusable view angle range from the object distance, the object area, and the photographing information and determining whether or not the object area is included in the refocusable view angle range through a comparison regarding position between the object area and the refocusable view angle range, in response to a user operation.

2. An image pickup apparatus according to claim 1, wherein the refocusing possibility determining unit is configured to calculate the refocusable view angle range in accordance with a direction of pupil division of the pupil-division pixel area of the image pickup element.

3. An image pickup apparatus according to claim 1, wherein the refocusing possibility determining unit is configured to determine that the refocusing for bringing the at least one object into focus is possible when the object area of the at least one object is included in the refocusable view angle range, and to determine that the refocusing for bringing the at least one object into focus is impossible when the object area of the at least one object is outside of the refocusable view angle range.

4. An image pickup apparatus according to claim 3, wherein the refocusing possibility determining unit is configured to determine that the refocusing for bringing the at least one object into focus is possible when the object area of the at least one object is entirely included in the refocusable view angle range.

5. An image pickup apparatus according to claim 1, wherein the instructions cause the image pickup apparatus to further function as a focus adjustment unit configured to determine which one of control of the refocusing of the image and driving of a focus lens is performed when performing focus adjustment to bring a main object selected from the at least one object into focus, based on a result of determination for possibility of refocusing for bringing the main object into focus by the refocusing possibility determining unit.

6. An image pickup apparatus according to claim 5, wherein the focus adjustment unit is configured to perform the focus adjustment through the refocusing when the refocusing possibility determining unit determines that the refocusing for bringing the main object into focus is possible, and to perform the focus adjustment by driving the focus lens when the refocusing possibility determining unit determines that the refocusing for bringing the main object into focus is impossible.

7. An image pickup apparatus according to claim 5, wherein the refocusing possibility determining unit is configured to adjust a refocusable distance range so that the object distance to the main object is included in the refocusable distance range, and to determine the possibility of refocusing for bringing the main object into focus through comparison between the refocusable view angle range calculated from the adjusted refocusable distance range and the object area of the main object.

8. An image pickup apparatus according to claim 5, wherein the refocusing possibility determining unit is configured to adjust the refocusable view angle range so that the object area of the main object is included in the refocusable view angle range, and to determine the possibility of refocusing for bringing the main object into focus through comparison between a refocusable distance range calculated from the adjusted refocusable view angle range and the object distance to the main object.

9. An image pickup apparatus according to claim 5, further comprising a display configured to display the possibility of refocusing for bringing the at least one object into focus together with the image, based on the result of determination made by the refocusing possibility determining unit.

10. An image pickup apparatus according to claim 1, wherein the instructions cause the image pickup apparatus to further function as units comprising:
   (1) a parameter generating unit configured to generate a parameter necessary for the refocusing of the image to bring the at least one object into focus in association with the at least one object based on the photographing information;
   (2) a recording unit configured to record a result of determination made by the refocusing possibility determining unit and the parameter as metadata of the image together with the image on a recording medium; and
   (3) a reproducing unit configured to read the image and the metadata recorded on the recording medium so as to refocus the image to bring the at least one object into focus.

11. An image pickup apparatus according to claim 10, wherein the refocusing possibility determining unit is configured to calculate the refocusable view angle range for each of the objects.

12. An image pickup apparatus according to claim 10, wherein the parameter generating unit is configured to generate a transform matrix being a null matrix as the parameter for an object determined as unrefocusable by the refocusing possibility determining unit, and to generate a transform matrix corresponding to the object distance to the object for an object determined as refocusable by the refocusing possibility determining unit.

13. An image pickup apparatus according to claim 10, wherein the refocusing possibility determining unit is configured to, when determining the refocusing for bringing a main object selected from the at least one object into focus is impossible, determine that the refocusing for bringing the main object into focus is possible after changing the refocusable view angle range so that the object area of the main object is included in the refocusable view angle range, and wherein the parameter generating unit is configured to generate a parameter for reconstructing the same view angle as the changed refocusable view angle range in association with the main object.

14. An image pickup apparatus according to claim 10, further comprising a display configured to display the possibility of refocusing for bringing the at least one object into focus together with the image, based on the metadata.

15. An image pickup apparatus according to claim 14, wherein the display is configured to perform display different from display for an object determined as refocusable by the refocusing possibility determining unit, for an object determined as unrefocusable by the refocusing possibility determining unit.

16. An image pickup apparatus according to claim 14, wherein the display is configured to display one of a character and a symbol as the result of determination of the possibility of refocusing, which is made by the refocusing possibility determining unit, so as to be superimposed on the image.

17. An image pickup apparatus according to claim 14, wherein the display is configured to display a message indicating that the refocusing is possible so that the message is superimposed on the image for an object determined as refocusable by the refocusing possibility determining unit, or display a message indicating that the refocusing is impossible so that the message is superimposed on the image for an object determined as unrefocusable by the refocusing possibility determining unit.

18. An image pickup apparatus according to claim 14, wherein the display is configured to display a frame so as to be superimposed on the object area on the image or display an emphasized profile of the at least one object on the image as the result of determination of the possibility of refocusing, which is made by the refocusing possibility determining unit, or display one of a texture and a single color as the result of determination of the possibility of refocusing, which is made by the refocusing possibility determining unit, so as to be superimposed on the object area on the image.

19. An apparatus-implemented method of controlling an image pickup apparatus configured to reconstruct a refocused image, the image pickup apparatus comprising one or more processors and a memory storing instructions executed by the one or more processors to effect the method, the method comprising:
acquiring, by the image pickup apparatus, an image photographed by using an image pickup element having a pupil-division pixel area together with photographing information of an optical system at a time of photographing, the photographing information including an F-number;
detecting, by the image pickup apparatus, at least one object on the image so as to calculate an object area of the at least one object and calculate an object distance corresponding to a depth distance to the at least one object from a defocus amount in the object area; and
determining, by the image pickup apparatus, possibility of refocusing for bringing the at least one object into focus by calculating a refocusable view angle range from the object distance, the object area, and the photographing information and determining whether or not the object area is included in the refocusable view angle range through a comparison regarding position between the object area and the refocusable view angle range, in response to a user operation.

20. A non-transitory computer-readable recording medium having recorded thereon a program for causing a computer comprising one or more processors that execute the program to cause the computer to function as an image pickup apparatus configured to reconstruct a refocused image, the image pickup apparatus comprising:
an acquisition unit configured to acquire an image photographed by using an image pickup element having a pupil-division pixel area together with photographing information of an optical system at a time of photographing, the photographing information including an F-number;
an object detecting unit configured to detect at least one object on the image so as to calculate an object area of the at least one object and calculate an object distance corresponding to a depth distance to the at least one object from a defocus amount in the object area; and
a refocusing possibility determining unit configured to determine possibility of refocusing for bringing the at least one object into focus by calculating a refocusable view angle range from the object distance, the object area, and the photographing information and determining whether or not the object area is included in the refocusable view angle range through a comparison regarding position between the object area and the refocusable view angle range, in response to a user operation.

* * * * *